US011586382B2

(12) United States Patent
Choi

(10) Patent No.: US 11,586,382 B2
(45) Date of Patent: Feb. 21, 2023

(54) MEMORY SYSTEM AND DATA PROCESSING SYSTEM FOR DISTRIBUTEDLY STORING INPUT DATA

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 918 days.

(21) Appl. No.: 16/385,825

(22) Filed: Apr. 16, 2019

(65) Prior Publication Data

US 2020/0057583 A1  Feb. 20, 2020

(30) Foreign Application Priority Data

Aug. 14, 2018  (KR) .................. 10-2018-0094933

(51) Int. Cl.
*G06F 3/06* (2006.01)
*G06F 12/0804* (2016.01)

(52) U.S. Cl.
CPC .......... *G06F 3/0659* (2013.01); *G06F 3/0604* (2013.01); *G06F 3/0688* (2013.01); *G06F 12/0804* (2013.01); *G06F 2212/1032* (2013.01)

(58) Field of Classification Search
CPC ........ G06F 3/0604; G06F 3/061; G06F 3/064; G06F 3/0644; G06F 3/0656;
(Continued)

(56) References Cited

U.S. PATENT DOCUMENTS

2012/0131265 A1* 5/2012 Koltsidas ............ G06F 12/0868
  711/E12.024
2014/0108705 A1  4/2014 Gorobets
(Continued)

FOREIGN PATENT DOCUMENTS

CN       1240280 A    1/2000
CN     101252603 A    8/2008
(Continued)

OTHER PUBLICATIONS

Office Action for the Chinese Patent Application No. 201910506693.4 including Search Report, issued by the Chinese Patent Office dated Dec. 13, 2022.

*Primary Examiner* — Larry T Mackall
(74) *Attorney, Agent, or Firm* — IP & T Group LLP

(57) ABSTRACT

A data processing system includes first memory system including a first nonvolatile memory device; a second memory system including a second nonvolatile memory device; and a master system including a third nonvolatile memory device. The master system classifies any one of the first memory system and the second memory system as a first slave system and the other as a second slave system depending on a predetermined reference, wherein the master system is coupled to a host, and includes a write buffer for temporarily storing a plurality of write data, and wherein in the master system classifies the write data, into first write data grouped into a transaction and second write data which are not grouped into the transaction, stores the second write data in the third nonvolatile memory device, and stores the first write data in the first nonvolatile memory device or the second nonvolatile memory device.

17 Claims, 18 Drawing Sheets

(58) Field of Classification Search
CPC ...... G06F 3/0658; G06F 3/0659; G06F 3/067; G06F 3/0683; G06F 3/0688; G06F 12/0804; G06F 2212/1032; G06F 2212/254; G06F 2212/261
See application file for complete search history.

(56) References Cited

U.S. PATENT DOCUMENTS

| | | |
|---|---|---|
| 2015/0277802 A1* | 10/2015 | Oikarinen ............ G06F 3/0689 711/114 |
| 2015/0363131 A1 | 12/2015 | Sinclair |
| 2016/0292111 A1 | 10/2016 | Doo et al. |
| 2016/0365138 A1 | 12/2016 | Cho |
| 2017/0010815 A1 | 1/2017 | Sprouse et al. |

FOREIGN PATENT DOCUMENTS

| | | |
|---|---|---|
| CN | 101373417 A | 2/2009 |
| CN | 102404368 A | 4/2012 |
| CN | 102480465 A | 5/2012 |
| CN | 103069380 A | 4/2013 |
| CN | 104216988 A | 12/2014 |
| CN | 106233264 A | 12/2016 |

\* cited by examiner

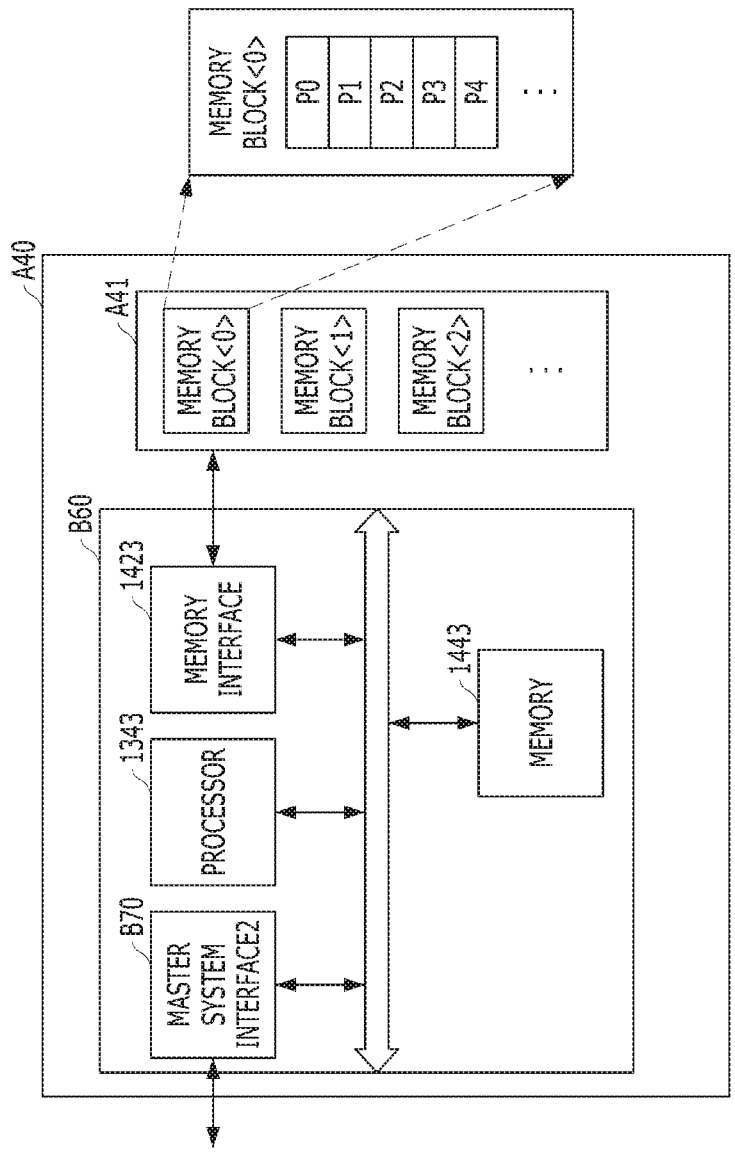

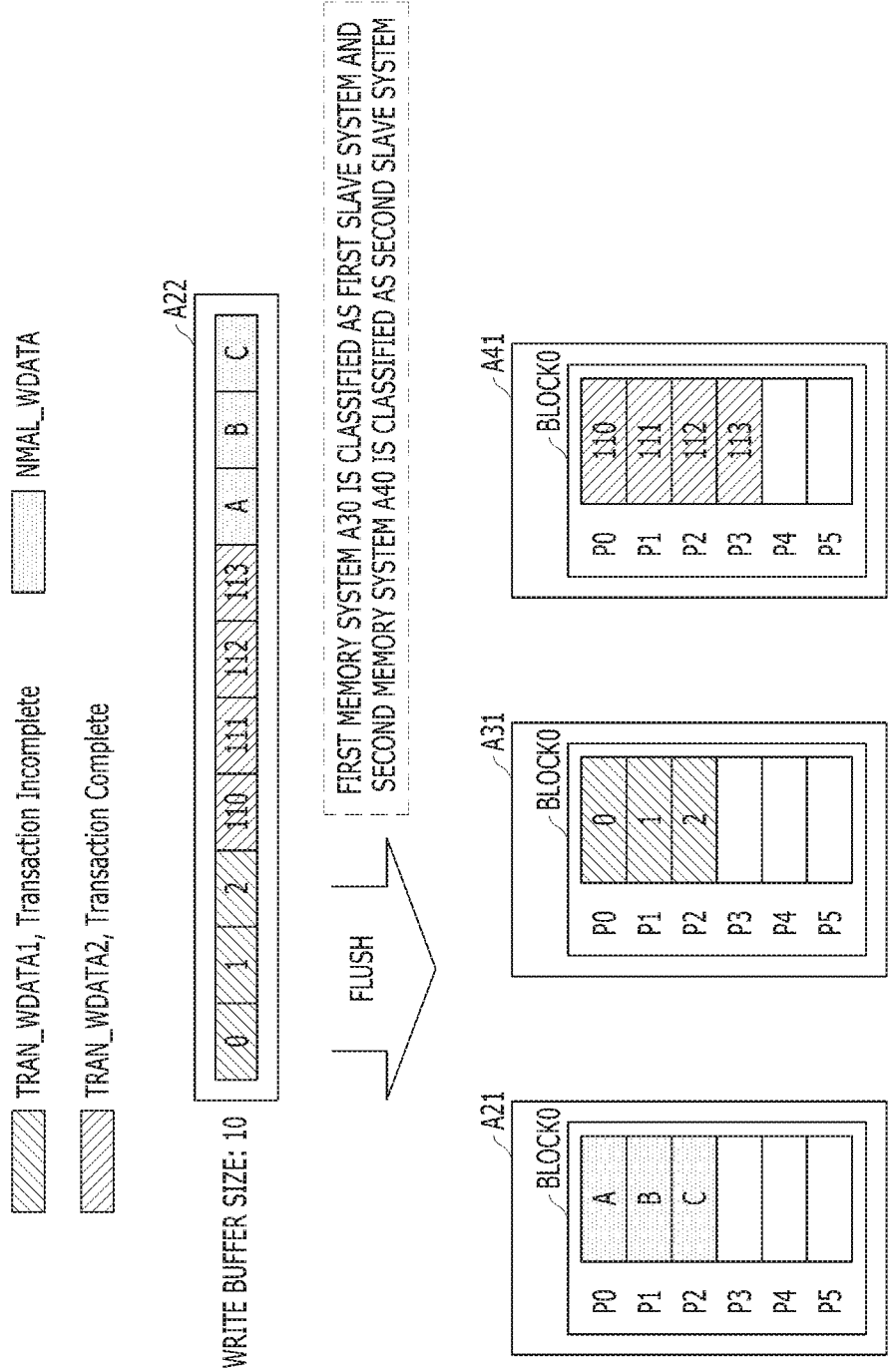

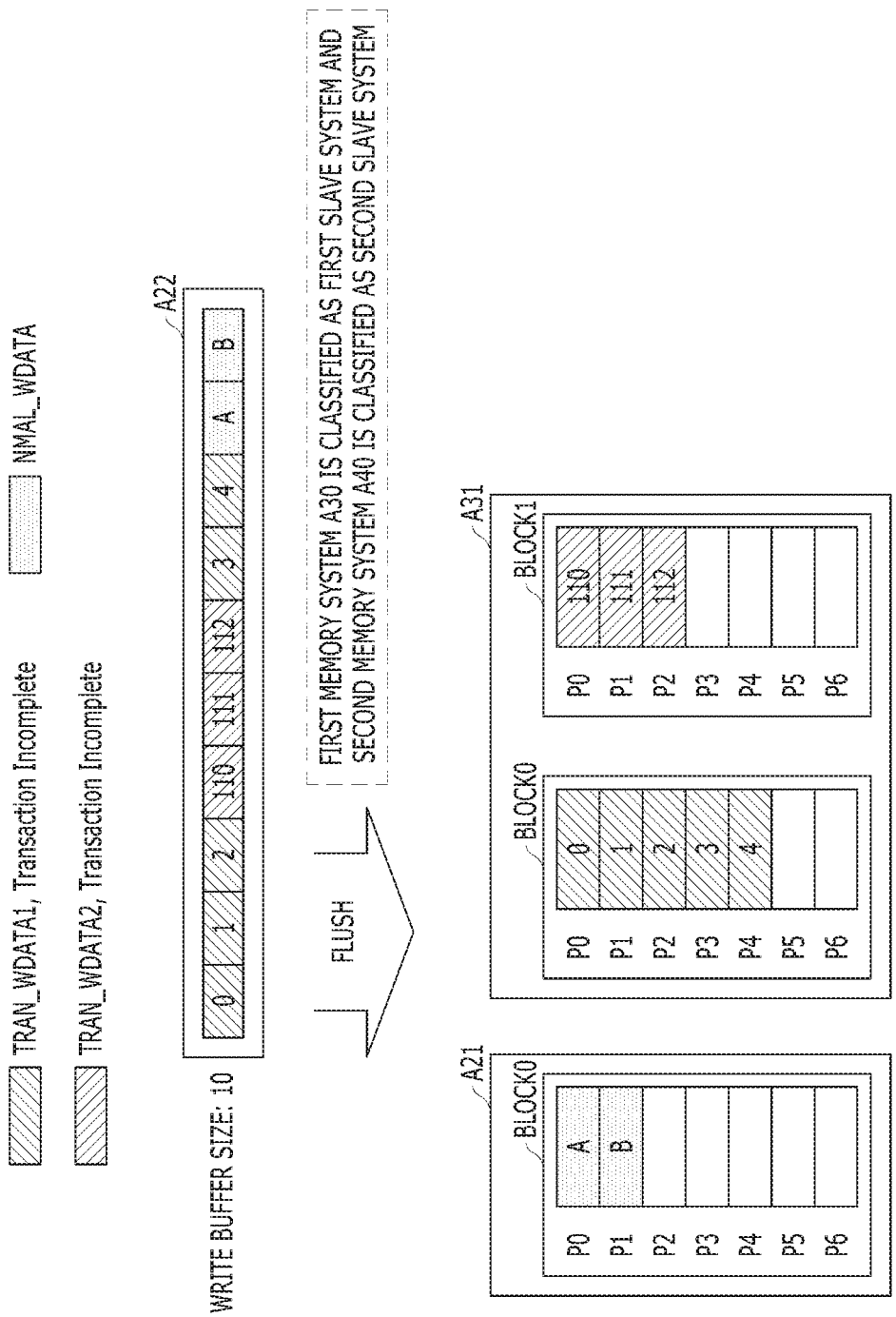

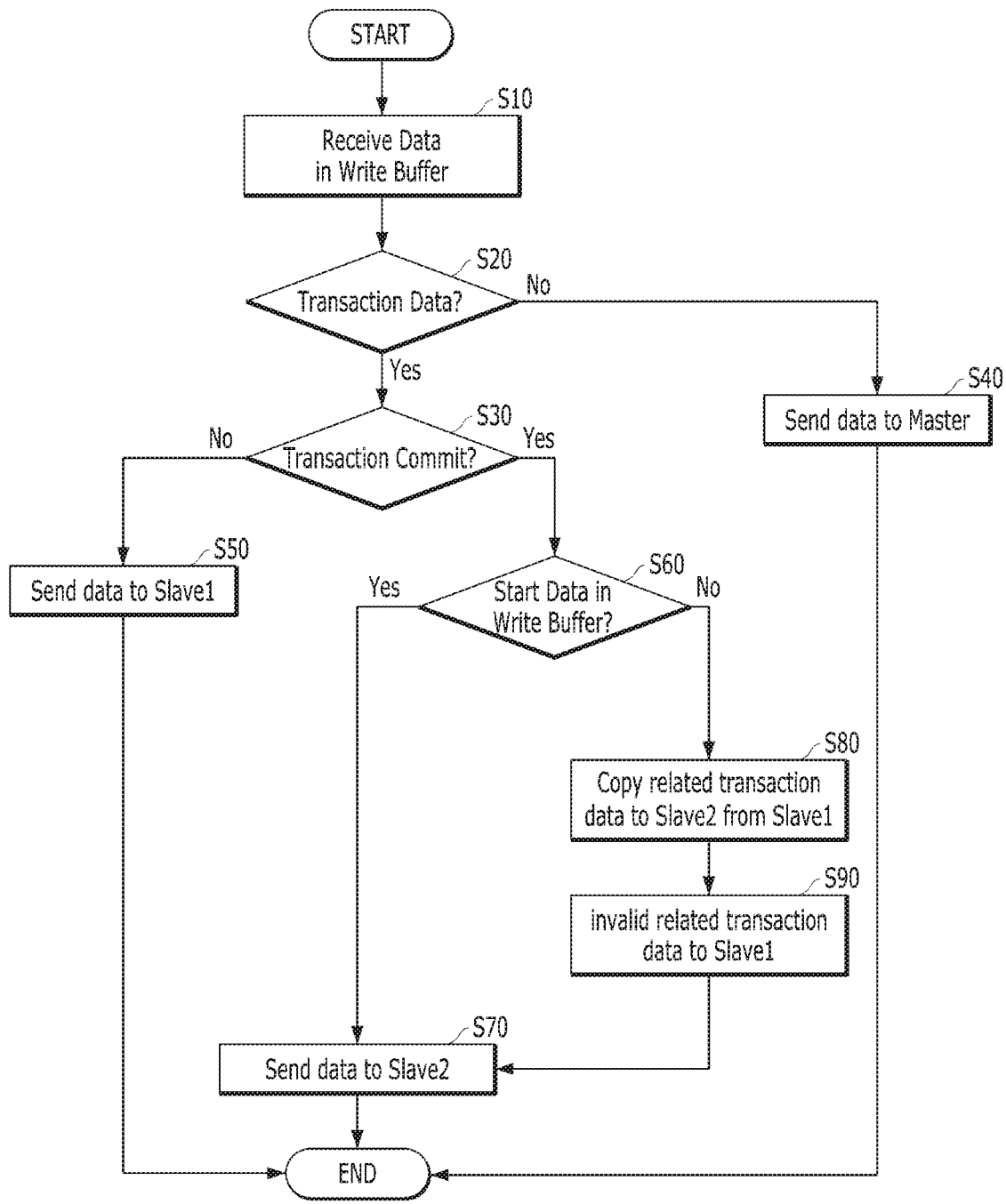

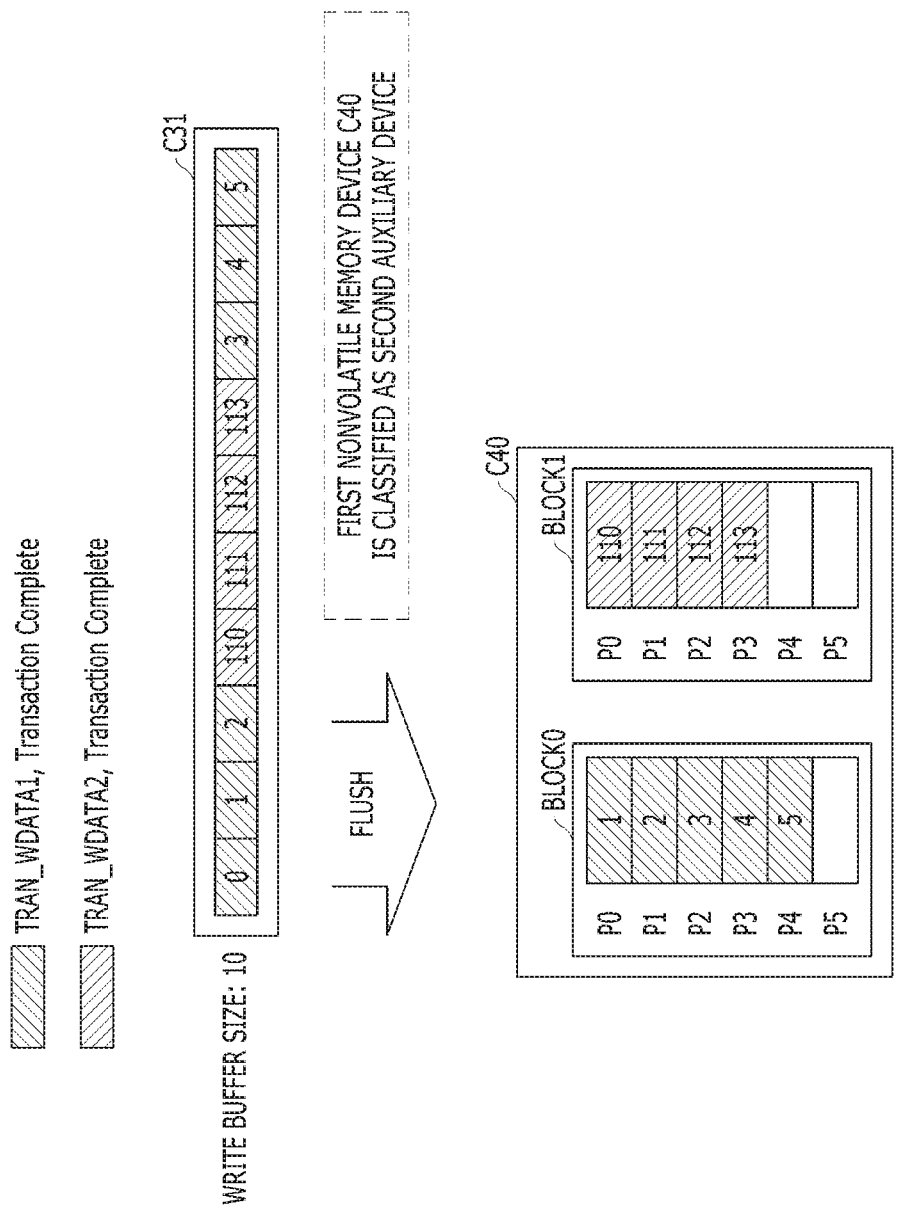

MEMORY SYSTEM AND DATA PROCESSING SYSTEM FOR DISTRIBUTEDLY STORING INPUT DATA

CROSS-REFERENCE TO RELATED APPLICATION

This application claims priority under 35 U.S.C. § 119(a) to Korean Patent Application No. 10-2018-0094933 filed on Aug. 14, 2018, which is incorporated herein by reference in its entirety.

BACKGROUND

1. Field

Exemplary embodiments relate to a memory system, and more particularly, to a memory system and a data processing system for distributedly storing data received from a host.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system and a data processing system, capable of effectively storing distributedly a plurality of write data grouped into a transaction.

In an embodiment, a data processing system may include: a first memory system including a first nonvolatile memory device; a second memory system including a second nonvolatile memory device; and a master system including a third nonvolatile memory device, and configured to classify any one of the first memory system and the second memory system as a first slave system and the other as a second slave system depending on a predetermined reference. The master system may be directly coupled to a host, and may include a write buffer for temporarily storing a plurality of write data inputted from the host. The master system may classify the write data stored in the write buffer, into first write data grouped into a transaction and second write data which are not grouped into a transaction, may store the second write data in the third nonvolatile memory device, and may store the first write data in the first nonvolatile memory device or the second nonvolatile memory device.

The master system may classify first write data which are incompletely committed among the first write data stored in the write buffer, into third write data, may classify first write data which are completely committed among the first write data stored in the write buffer, into fourth write data, may store the third write data in a nonvolatile memory device included in the first slave system, by transferring the third write data to the first slave system, and may store the fourth write data in a nonvolatile memory device included in the second slave system, by transferring the fourth write data to the second slave system.

The master system may perform, in the case where both the first nonvolatile memory device and the second nonvolatile memory device are capable or incapable of being overwritten, a first comparison operation of comparing a total size of the first nonvolatile memory device and a total size of the second nonvolatile memory device, may classify, in the case where, as a result of the first comparison operation, the total size of the first nonvolatile memory device is smaller, the first memory system as the first slave system and the second memory system as the second slave system, and may classify, in the case where, as a result of the first comparison operation, the total size of the first nonvolatile memory device is larger, the second memory system as the first slave system and the first memory system as the second slave system.

The master system may perform, in the case where, as a result of the first comparison operation, the total size of the first nonvolatile memory device and the total size of the second nonvolatile memory device are the same, a second comparison operation of comparing a size of an empty space in the first nonvolatile memory device and a size of an empty space in the second nonvolatile memory device, may classify, in the case where, as a result of the second comparison operation, the size of the empty space in the first nonvolatile memory device is smaller, the first memory system as the first slave system and the second memory system as the second slave system, and may classify, in the case where, as a result of the second comparison operation, the size of the empty space in the first nonvolatile memory device is larger, the second memory system as the first slave system and the first memory system as the second slave system.

The master system may classify, in the case where any one of the first nonvolatile memory device and the second nonvolatile memory device is capable of being overwritten and the other is incapable of being overwritten, the nonvolatile memory device which is capable of being overwritten, as the first slave system, and the other nonvolatile memory device which is incapable of being overwritten, as the second slave system.

The master system may store, at a time of classifying the first write data into the fourth write data, in the case where start data of a first transaction is included in fourth write data of the first transaction stored in the write buffer, the fourth write data of the first transaction stored in the write buffer, in the nonvolatile memory device included in the second slave system, by transferring them to the second slave system.

When classifying the first write data into the fourth write data, in the case where start data of the data group for a second transaction is not included in fourth write data of the second transaction stored in the write buffer, the master system may read remaining data of the second transaction which are not stored in the write buffer, from the nonvolatile memory device included in the first slave system, through the first slave system, may store the remaining data in the nonvolatile memory device included in the second slave system by transferring the remaining data to the second slave system, and may invalidate the remaining data of the second transaction in the nonvolatile memory device included in the first slave system, through the first slave system, and may store the fourth write data of the second transaction stored in the write buffer, in the nonvolatile memory device included in the second slave system, by transferring the fourth write data of the second transaction to the second slave system.

The master system, in a recovery operation period that is entered after a sudden power-off (SPO) occurs, may invalidate all data stored in the nonvolatile memory device included in the first slave system, through the first slave system, and transfers an information on a transaction corresponding to the invalided data, to the host.

Each of the first nonvolatile memory device and the second nonvolatile memory device may include a plurality of memory blocks. The first slave system, in the case where third write data of a third transaction and third write data of a fourth transaction are received therein from the master system, may store the third write data of the third transaction by selecting a first memory block of the nonvolatile memory device included therein, and may store the third write data of the fourth transaction by selecting a second memory block of the nonvolatile memory device included therein. The second slave system, in the case where fourth write data of a fifth transaction and fourth write data of a sixth transaction are received therein from the master system, may store the fourth write data of the fifth transaction by selecting a third memory block of the nonvolatile memory device included therein, and may store the fourth write data of the sixth transaction by selecting a fourth memory block of the nonvolatile memory device included therein.

In an embodiment, a memory system may include: a first nonvolatile memory device; a second nonvolatile memory device; a third nonvolatile memory device; and a controller configured to classify any one of the first nonvolatile memory device, the second nonvolatile memory device and the third nonvolatile memory device, as a main device, and any one of remaining two as a first auxiliary device and the other as a second auxiliary device, depending on a predetermined reference. The controller may include a write buffer for temporarily storing a plurality of write data inputted from a host. The controller may classify the write data stored in the write buffer, into first write data grouped into a transaction and second write data which are not grouped into a transaction, may store the second write data in the main device, and may distribute the first write data in the first auxiliary device and the second auxiliary device.

The controller may classify first write data which are incompletely committed among the first write data stored in the write buffer, into third write data, and may classify first write data which are completely committed among the first write data stored in the write buffer, into fourth write data, may store the third write data in the first auxiliary device, and may store the fourth write data in the second auxiliary device.

The controller may perform, in the case where all of the first nonvolatile memory device, the second nonvolatile memory device and the third nonvolatile memory device are capable of being overwritten or are incapable of being overwritten, a first comparison operation of comparing a total size of the first nonvolatile memory device, a total size of the second nonvolatile memory device and a total size of the third nonvolatile memory device. The controller may classify, as a result of the first comparison operation, a memory device having a largest size as the main device, a memory device having a smallest size as the first auxiliary device, and a memory device having a middle size as the second auxiliary device.

The controller may perform, in the case where, as a result of the first comparison operation, all of the first nonvolatile memory device, the second nonvolatile memory device and the third nonvolatile memory device having the same total size, a second comparison operation of comparing a size of an empty space in the first nonvolatile memory device, a size of an empty space in the second nonvolatile memory device and a size of an empty space in the third nonvolatile memory device. The controller may classify, as a result of the second comparison operation, a memory device having a largest empty space size as the main device, a memory device having a smallest empty space size as the first auxiliary device, and a memory device having a middle empty space size as the second auxiliary device.

The controller may classify, in the case where any one of the first nonvolatile memory device, the second nonvolatile memory device and the third nonvolatile memory device is capable of being overwritten and remaining two are incapable of being overwritten, the any one memory device which is capable of being overwritten, as the first auxiliary device, any one of which total size is larger, between the remaining two memory devices which are incapable of being overwritten, as the main device, and the other as the second auxiliary device, and the controller classifies, in the case where total sizes of the remaining two memory devices which are incapable of being overwritten are the same, any one of which empty space is larger, as the main device, and the other as the second auxiliary device. The controller may classify, in the case where any one of the first nonvolatile memory device, the second nonvolatile memory device and the third nonvolatile memory device is incapable of being overwritten and remaining two are capable of being overwritten, the any one memory device which is incapable of being overwritten, as the main device, any one of which total size is smaller, between the remaining two memory devices which are capable of being overwritten, as the first auxiliary device, and the other as the second auxiliary device, and the controller classifies, in the case where total sizes of the remaining two memory devices which are capable of being overwritten are the same, any one of which empty space is smaller, as the first auxiliary device, and the other as the second auxiliary device.

At a time of classifying the first write data into the fourth write data, in the case where start data of the data group for a first transaction is included in fourth write data of the first transaction stored in the write buffer, the controller may store the fourth write data of the first transaction stored in the write buffer, in the second auxiliary device.

When classifying the first write data into the fourth write data, in the case where start data of a second transaction is not included in fourth write data of the second transaction stored in the write buffer, the controller may read remaining data of the second transaction which are not stored in the write buffer, from the first auxiliary device, stores the remaining data in the second auxiliary device, and may invalidate the remaining data of the second transaction in the first auxiliary device, and may store the fourth write data of the second transaction stored in the write buffer, in the second auxiliary device.

In a recovery operation period that is entered after a sudden power-off (SPO) occurs, the controller may invalidate all data stored in the first auxiliary device, and may transfer an information on a transaction corresponding to the invalided data, to the host.

Each of the first auxiliary device and the second auxiliary device may include a plurality of memory blocks. The controller, in the case where, when performing a flush operation, third write data of a third transaction, third write data of a fourth transaction, fourth write data of a fifth transaction and fourth write data of a sixth transaction are stored in the write buffer, may store the third write data of the third transaction by selecting a first memory block of the first auxiliary device, may store the third write data of the fourth transaction by selecting a second memory block of the first auxiliary device, may store the fourth write data of the fifth transaction by selecting a third memory block of the second auxiliary device, and stores the fourth write data of the sixth transaction by selecting a fourth memory block of the second auxiliary device.

In an embodiment, a memory system may include: first and second memory devices; a buffer suitable for buffering first partial and first whole data groups for transactions provided from an external; and a control unit suitable for: controlling the first and second memory devices to store the first partial and first whole data groups, respectively therein, by flushing the buffered data groups; and controlling, when the first partial data group forms together with a second partial data group stored in the first memory device a second whole data group at the flushing, the first and second memory devices to move the second partial data group from the first memory device into the second memory device at the flushing.

In the present technology, data received from a host are stored by being appropriately distributed over a plurality of storage devices (a plurality of nonvolatile memory devices or a plurality of memory systems), depending on whether the received data are grouped into a transaction or not, and whether transaction data are committed or not.

Through this, it is possible that an algorithm for ensuring the transaction data may be simplified. Moreover, it is possible to easily distinguish the valid/invalid state of the transaction data in an SPOR (sudden power-off recovery) operation may be provided.

BRIEF DESCRIPTION OF THE DRAWINGS

FIGS. 1 and 2A to 2C are diagrams of a data processing system including a plurality of memory systems in accordance with a first embodiment of the present disclosure.

FIGS. 3A to 3E are diagrams of the operation of the data processing system including a plurality of memory systems in accordance with the first embodiment of the present disclosure.

FIG. 4 is a flow chart of the operation of the data processing system including a plurality of memory systems in accordance with the first embodiment of the present disclosure.

FIGS. 7A to 7E are diagrams of the data processing system including a plurality of memory systems in accordance with the second embodiment of the present disclosure.

DETAILED DESCRIPTION

Figure 1:
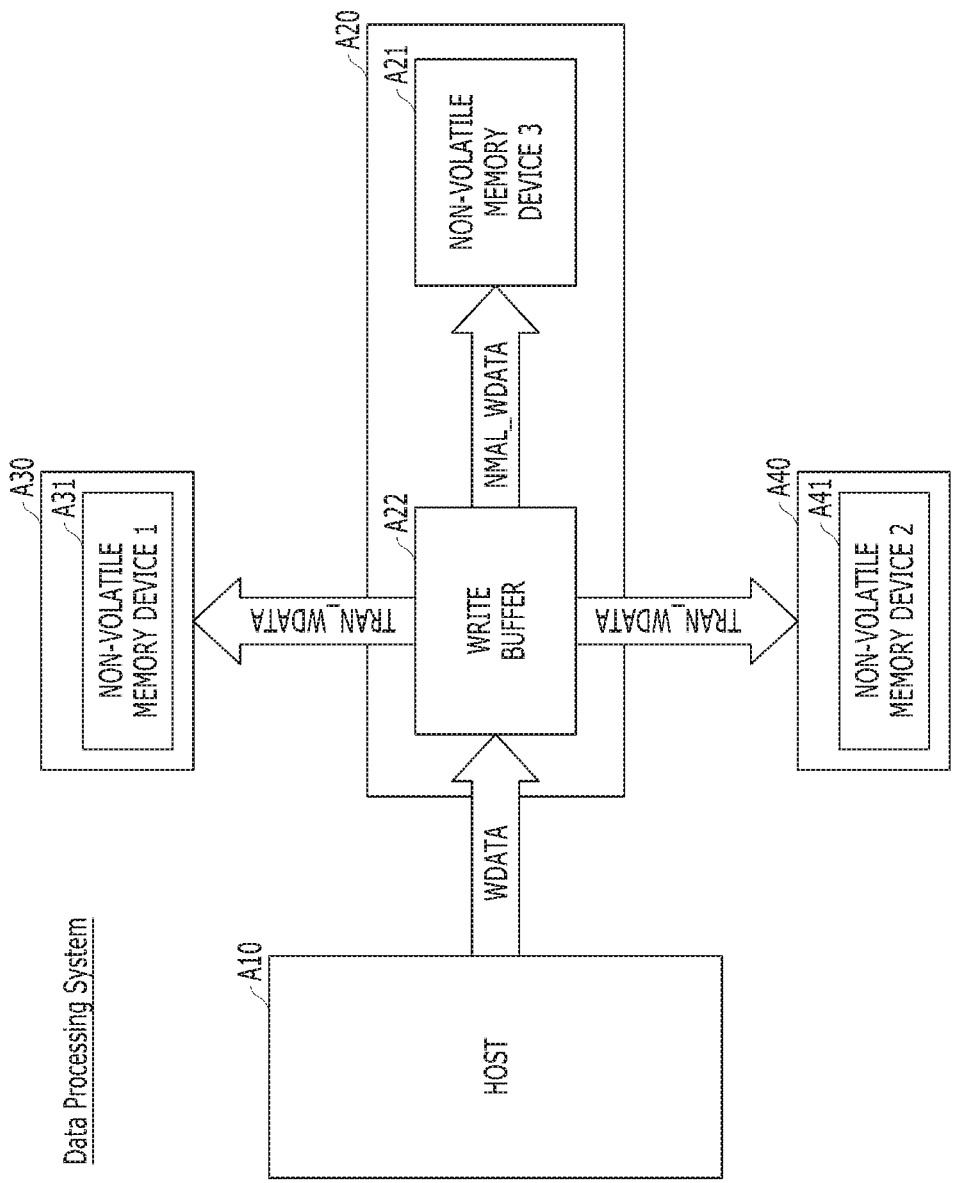

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

First Embodiment

FIGS. 1 and 2A to 2C are diagrams of a data processing system including a plurality of memory systems in accordance with a first embodiment of the present disclosure.

Referring to FIG. 1, the data processing system in accordance with the first embodiment of the present disclosure includes a host A10 and memory systems A20, A30 and A40. The memory systems A20, A30 and A40 include a master system A20, a first memory system A30 and a second memory system A40.

The host A10 transmits a plurality of commands corresponding to a user request to the memory systems A20, A30 and A40, and accordingly, the memory systems A20, A30 and A40 perform operations corresponding to the commands, that is, operations corresponding to the user request.

The memory systems A20, A30 and A40 operate in response to a request of the host A10, in particular, store data to be accessed by the host A10. In other words, each of the memory systems A20, A30 and A40 may be used as a main memory device or an auxiliary memory device of the host A10.

Each of the memory systems A20, A30 and A40 may be realized by any one of various kinds of storage devices, depending on a host interface protocol which is coupled with the host A10. For example, each of the memory systems A20, A30 and A40 may be realized by any one of various kinds of storage devices such as a solid state drive (SSD), a multimedia card in the form of an MMC, an eMMC (embedded MMC), an RS-MMC (reduced size MMC) and a micro-MMC, a secure digital card in the form of an SD, a mini-SD and a micro-SD, a universal serial bus (USB) storage device, a universal flash storage (UFS) device, a compact flash (CF) card, a smart media card, a memory stick, and so forth.

Each of the memory systems A20, A30 and A40 may be integrated into one semiconductor device and configure a memory card. For instance, each of the memory systems A20, A30 and A40 may configure a memory card such as a Personal Computer Memory Card International Association (PCMCTA) card, a compact flash (CF) card, a smart media card in the form of an SM and an SMC, a memory stick, a multimedia card in the form of an MMC, an RS-MMC and a micro-MMC, a secure digital card in the form of an SD, a mini-SD, a micro-SD and an SDHC, and a universal flash storage (UFS) device.

For another instance, each of the memory systems A20, A30 and A40 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID (radio frequency identification) device, or one of various component elements configuring a computing system.

Each of the memory systems A20, A30 and A40 may include a storage device such as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), a resistive RAM (RRAM) and a flash memory.

The master system A20 is directly coupled to the host A10. The master system A20 includes a write buffer A22 for temporarily storing a plurality of write data WDATA inputted from the host A10. The master system A20 further includes a third nonvolatile memory device A21 which may receive and store e data WDATA transferred from the write buffer A22.

The first memory system A30 is directly coupled with the master system A20. The first memory system A30 includes a first nonvolatile memory device A31 which may store write data WDATA transferred from the write buffer A22 in the master system A20.

The second memory system A40 is directly coupled with the master system A20. The second memory system A40 includes a second nonvolatile memory device A41 which may store write data WDATA transferred from the write buffer A22 in the master system A20.

That is, the first memory system A30 and the second memory system A40 are coupled to the host A10 through the master system A20.

The master system A20 may classify any one of the first memory system A30 and the second memory system A40 as a first slave system SLAVE1 and the other as a second slave system SLAVE2 depending on a predetermined reference.

In detail, in the case where both the first nonvolatile memory device A31 and the second nonvolatile memory device A41 are capable or incapable of being overwritten, the master system A20 performs a first comparison operation of comparing the total size of the first nonvolatile memory device A31 and the total size of the second nonvolatile memory device A41.

As a result of such a first comparison operation, in the case where the total size of the first nonvolatile memory device A31 is smaller than the total size of the second nonvolatile memory device A41, the master system A20 classifies the first memory system A30 as the first slave system SLAVE1 and classifies the second memory system A40 as the second slave system SLAVE2.

Also, as a result of the first comparison operation, in the case where the total size of the first nonvolatile memory device A31 is larger than the total size of the second nonvolatile memory device A41, the master system A20 classifies the first memory system A30 as the second slave system SLAVE2 and classifies the second memory system A40 as the first slave system SLAVE1.

As a result of the first comparison operation, in the case where the total size of the first nonvolatile memory device A31 and the total size of the second nonvolatile memory device A41 are the same with each other, the master system A20 performs a second comparison operation of comparing the size of an empty space in the total size of the first nonvolatile memory device A31 and the size of an empty space in the total size of the second nonvolatile memory device A41.

As a result of such a second comparison operation, in the case where the size of the empty space of the first nonvolatile memory device A31 is smaller than the size of the empty space of the second nonvolatile memory device A41, the master system A20 classifies the first memory system A30 as the first slave system SLAVE1 and classifies the second memory system A40 as the second slave system SLAVE2.

Also, as a result of the second comparison operation, in the case where the size of the empty space of the first nonvolatile memory device A31 is larger than the size of the empty space of the second nonvolatile memory device A41, the master system A20 classifies the first memory system A30 as the second slave system SLAVE2 and classifies the second memory system A40 as the first slave system SLAVE1.

In the case where any one memory device of the first nonvolatile memory device A31 and the second nonvolatile memory device A41 is capable of being overwritten and the other is incapable of being overwritten, the master system A20 classifies any one memory device which is capable of being overwritten, as the first slave system SLAVE1, and classifies the other memory device which is incapable of being overwritten, as the second slave system SLAVE2.

For example, in the case where the first nonvolatile memory device A31 is a memory device which is capable of being overwritten and the second nonvolatile memory device A41 is a memory device which is incapable of being overwritten, the master system A20 classifies the first memory system A30 as the first slave system SLAVE1 and classifies the second memory system A40 as the second slave system SLAVE2.

The master system A20 stores the write data WDATA stored in the write buffer A22, in the third nonvolatile memory device A21, or stores the write data WDATA stored in the write buffer A22, in the first nonvolatile memory device A31 or the second nonvolatile memory device A41, by distributing the write data WDATA to the first slave system SLAVE1 and the second slave system SLAVE2, depending on a result of analyzing the characteristics of the write data W DATA.

In detail, the master system A20 classifies the write data WDATA stored in the write buffer A22 into first write data TRAN_WDATA which are grouped into a transaction and second write data NMAL_WDATA which are not grouped into a transaction.

At a time of performing a flush operation for the write buffer A22, the master system A20 stores the second write data NMAL_WDATA which are not grouped into a transaction, in the third nonvolatile memory device A21.

Further, at the time of performing the flush operation for the write buffer A22, the master system A20 distributes the first write data TRAN_WDATA to the first slave system SLAVE1 and the second slave system SLAVE2, and thereby stores the first write data TRAN_WDATA in the first nonvolatile memory device A31 or the second nonvolatile memory device A41.

The fact that write data WDATA are grouped into a transaction means that a plurality of write data WDATA used for the same use are grouped into one transaction.

For example, in a database, data used for the correction, addition and update of already stored data may be grouped into respective transactions according to the respective uses. In this regard, data for correcting a database may be set to be grouped into one transaction group, and data for adding a database may be set to be grouped into another transaction group.

Therefore, when write data TRAN_WDATA which are grouped into one transaction are transmitted from the host A10 to the master system A20, there exists either only a commit state in which all of the write data TRAN_WDATA are normally transmitted and stored and are thus valid, or an abort state in which any one of the write data TRAN_WDATA which is not normally transmitted and stored, or all of the write data TRAN_WDATA are invalid according to an abort request of the host A10. That is, write data TRAN_WDATA which are grouped into one transaction are meaningful only when the write data TRAN_WDATA are in a commit state as all of the write data TRAN_WDATA are normally transmitted and stored, and are thus all valid.

For example, the first write data TRAN_WDATA grouped into a transaction may be determined to be in a commit state when all pieces of first write data TRAN_WDATA are normally transmitted from the host A10 to the master system A20 and are completely stored in the master system A20 and there is no abort request from the host A10. If any piece of first write data TRAN_WDATA is not normally transmitted and stored, or an abort request is received from the host A10, all of the first write data TRAN_WDATA are determined to be in an abort state.

For reference, the operation of managing the first write data TRAN_WDATA grouped into a transaction, by classifying them into a commit state or an abort state as described above, may be generally be referred to as an operation for ensuring the transaction.

The master system A20 classifies first write data TRAN_WDATA which are not completely in a commit state among the first write data TRAN_WDATA stored in the write buffer A22, as third write data, and classifies first write data TRAN_WDATA which are completely in a commit state, as fourth write data.

In the above states, when performing the flush operation for the write buffer A22, the master system A20 transfers the third write data to the first slave system SLAVE1 and stores the third write data in the nonvolatile memory device included in the first slave system SLAVE1.

Also, when performing the flush operation for the write buffer A22, the master system A20 transfers the fourth write data to the second slave system SLAVE2 and stores the fourth write data in the nonvolatile memory device included in the second slave system SLAVE2.

For example, in the case where the first memory system A30 is classified as the first slave system SLAVE1 and the second memory system A40 is classified as the second slave system SLAVE2, the master system A20 stores the third write data in the first nonvolatile memory device A31, and stores the fourth write data in the second nonvolatile memory device A41.

Conversely, in the case where the first memory system A30 is classified as the second slave system SLAVE2 and the second memory system A40 is classified as the first slave system SLAVE1, the master system A20 stores the third write data in the second nonvolatile memory device A41, and stores the fourth write data in the first nonvolatile memory device A31.

When classifying the first write data TRAN_WDATA stored in the write buffer A22 as the fourth write data, the master system A20 checks whether the start data of the fourth write data corresponding to the transaction is included in the fourth write data stored in the write buffer A22.

For example, a state in which first write data TRAN_WDATA grouped into a first transaction and a second transaction are stored in the write buffer A22 may be assumed. In this state, when the first transaction is committed, that is, when the first write data TRAN_WDATA of the first transaction are classified as the fourth write data of the first transaction, the master system A20 checks whether the start data of the first transaction is stored in the write buffer A22. Similarly, when the second transaction is committed, that is, when the first write data TRAN_WDATA of the second transaction are classified as the fourth write data of the second transaction, the master system A20 checks whether the start data of the second transaction is stored in the write buffer A22.

As a result of checking whether the start data is stored, when the start data of the first transaction is stored in the write buffer A22 at the time when the first transaction is committed, it may be seen that it is a state in which all of the first write data 0 grouped into the first transaction are stored in the write buffer A22 as the fourth write data.

The fact that the first transaction is committed means that all of the first write data TRAN_WDATA grouped into the first transaction have been completely transmitted to the master system A20. Namely, the fact that the first transaction is committed means that all (i.e., from the start data to last data) of the first write data TRAN_WDATA grouped into the first transaction have been completely transmitted to the master system A20.

Therefore, from the fact that the fourth write data grouped into the first transaction are stored in the write buffer A22 in a state in which the fourth write data include the start data of the first transaction, it may be seen that the fourth write data stored in the write buffer A22 are all of the data in the first transaction.

In this way, in the case where it is checked that the start data of a transaction is included in the fourth write data stored in the write buffer A22, the master system A20 transmits all of the fourth write data stored in the write buffer A22 to the second slave system SLAVE2 when a flush operation for the write buffer A22 is performed, and thereby stores the fourth write data in the nonvolatile memory device included in the second slave system SLAVE2.

As a result of checking whether start data is stored, in the case where the start data of the second transaction is not stored in the write buffer A22 when the second transaction is committed, it may be seen that it is not a state in which all of the first write data TRAN_WDATA grouped into the second transaction are stored in the write buffer A22 as the fourth write data.

Some data including the start data of the second transaction may be stored in the nonvolatile memory device included in the first slave system SLAVE_1.

This is because, as described above for the master system A20, in the case where first write data TRAN_WDATA which are not completely in a commit state are stored in the write buffer A22 when performing the flush operation for the write buffer A22, the first write data TRAN_WDATA which are not completely in a commit state are transmitted to the first slave system SLAVE1 and are thereby written in the nonvolatile memory device included in the first slave system SLAVE1.

In the case where the start data of the second transaction is not stored in the write buffer A22 when the second transaction is committed, a flush operation has been performed for the write buffer A22 before the second transaction is committed after being started. Thus, the first write data TRAN_WDATA grouped into the second transaction which were stored in the write buffer A22, have been written in the nonvolatile memory device included in the first slave system SLAVE1.

Therefore, in the case where the start data of the second transaction is not stored in the write buffer A22 when the second transaction is committed, the master system A20 reads remaining data (including the start data of the data group) of the second transaction, which are not stored in the write buffer A22, from the nonvolatile memory device included in the first slave system SLAVE1, and writes the remaining data in the nonvolatile memory device included in the second slave system SLAVE2. Then, the master system A20 invalidates the remaining data of the second transaction in the nonvolatile memory device included in the first slave system SLAVE1. In succession, the master system A20 transfers fourth write data of the second transaction which are stored in the write buffer A22, to the second slave system SLAVE2, and thereby, stores them in the nonvolatile memory device included in the second slave system SLAVE2.

In a recovery operation period that is entered after a sudden power-off (SPO) occurs, the master system A20 invalidates all data stored in the nonvolatile memory device included in the first slave system SLAVE1.

The reason for this is that, in the case where an SPO occurs, first write data TRAN_WDATA which are not completely in a commit state may be lost while being stored in the write buffer A22 which is a volatile memory device. Due to this fact, a transaction of first write data TRAN_WDATA which is not completely in a commit state and is not lost when the SPO occurs because the first write data TRAN_WDATA is stored in the nonvolatile memory device included in the first slave system SLAVE1, may not be ensured.

Therefore, in the case where an SPO occurs, in order to invalidate all first write data TRAN_WDATA which are not completely in a commit state, the master system A20 invalidates all of the data stored in the nonvolatile memory device included in the first slave system SLAVE1. In this way, after all of the data stored in the nonvolatile memory device included in the first slave system SLAVE1 are invalidated, the master system A20 transfers information on a transaction corresponding to the data invalidation, to the host A10.

When write data WDATA are inputted from the host A10, write commands (not shown) respectively corresponding to the write data WDATA are inputted together, and transaction information (not shown) of the respective write data WDATA are included in the write commands, respectively.

The transaction information of each of the write data WDATA may include a transaction identification (ID) information, a transaction commit information, a transaction abort information and a transaction start information.

The master system A20 stores the write data WDATA in the write buffer A22 in response to the respective write commands.

The master system A20 checks transaction ID information in the transaction information of the respective write data WDATA which are included in the write commands, and thereby, classifies the write data WDATA stored in the write buffer A22 into first write data TRAN_WDATA which are grouped into a transaction or second write data NMAL_WDATA which are not grouped into a transaction.

In detail, the master system A20 checks transaction ID information in the transaction information of the respective write data WDATA stored in the write buffer A22, and thereby, classifies write data WDATA of which transaction ID information are set to a specified value, into the first write data TRAN_WDATA.

On the other hand, the master system A20 checks transaction ID information in the transaction information of the respective write data WDATA stored in the write buffer A22, and thereby, classifies write data WDATA of which transaction ID information are not set to a specified value, into second write data NMAL_WDATA.

For example, the master system A20 may classify write data WDATA of which transaction ID information have a first value, among the write data WDATA stored in the write buffer A22, into first write data TRAN_WDATA which are grouped into a first transaction.

Also, the master system A20 may classify write data WDATA of which transaction ID information have a second value, among the write data WDATA stored in the write buffer A22, into first write data TRAN_WDATA which are grouped into a second transaction.

On the other hand, the master system A20 may classify write data WDATA of which transaction ID information are not set to any value, among the write data WDATA stored in the write buffer A22, into second write data NMAL_WDATA which are not grouped into a transaction.

For reference, the fact that transaction ID information are not set to any value may mean the case where transaction ID information are set to a predefined initial value or a value that is meaningless as a transaction ID information.

The master system A20 may check whether a commit is completed, by checking whether a preset commit information is included in the transaction information of the respective first write data TRAN_WDATA stored in the write buffer A22.

Similarly, the master system A20 may check whether an abort is completed, by checking whether a preset abort information is included in the transaction information of the respective first write data TRAN_WDATA stored in the write buffer A22.

The master system A20 may check whether transaction start data is stored in the write buffer A22, by checking whether a preset start information is included in the transaction information of the respective first write data TRAN_WDATA stored in the write buffer A22.

For example, in the case where a preset commit information is included in the transaction information of respective first write data TRAN_WDATA which are stored in the write buffer A22 and are grouped into the first transaction, the first write data TRAN_WDATA which are grouped into the first transaction may be regarded as completely committed.

In this regard, in the case where a preset start information is included in the transaction information of the respective first write data TRAN_WDATA which are stored in the write buffer A22 and are grouped into the first transaction, it may be seen that the first write data TRAN_WDATA which are grouped into the first transaction are completely committed and the start data of the first transaction is stored in the write buffer A22. Therefore, when performing a flush operation for the write buffer A22, the master system A20 stores all of the first write data TRAN_WDATA which are stored in the write buffer A22 and are grouped into the first transaction, in the second slave system SLAVE2.

Conversely, in the case where a preset start information is not included in the transaction information of the first write data TRAN_WDATA which are stored in the write buffer A22 and are grouped into the first transaction, it may be seen that the first write data TRAN_WDATA which are grouped into the first transaction are completely committed and the start data of the first transaction is not stored in the write buffer A22. Therefore, when performing a flush operation for the write buffer A22, the master system A20 receives remaining data (including the start data) of first write data TRAN_WDATA which are grouped into the first transaction, transferred from the first slave system SLAVE1, stores the received data in the second slave system SLAVE2, and then stores all of the first write data TRAN_WDATA which are stored in the write buffer A22 and are grouped into the first transaction, in the second slave system SLAVE2.

In the case where a preset commit information and a preset abort information are not included in the transaction information of respective first write data TRAN_WDATA which are stored in the write buffer A22 and are grouped into the second transaction, it may be regarded that the first write data TRAN_WDATA which are grouped into the second transaction are not completely committed and are not aborted. That is, it may be regarded that not all first write data TRAN_WDATA which are grouped into the second transaction are transmitted from the host A10 and are in a not committed state.

In the case where a preset start information is included in the transaction information of respective first write data TRAN_WDATA which are stored in the write buffer A22 and are grouped into the second transaction, it may be seen that the first write data TRAN_WDATA which are grouped into the second transaction are not completely committed and the start data of the second transaction is stored in the write buffer A22. Therefore, when performing a flush operation for the write buffer A22, the master system A20 stores all of the first write data TRAN_WDATA which are grouped into the second transaction, in the first slave system SLAVE1.

Conversely, in the case where a preset start information is not included in the transaction information of respective first write data TRAN_WDATA which are stored in the write buffer A22 and are grouped into the second transaction, it may be seen that first write data TRAN_WDATA which are grouped into the second transaction are not completely committed and the start data of the second transaction is not stored in the write buffer A22. Therefore, when performing a flush operation for the write buffer A22, the master system A20 stores the first write data TRAN_WDATA which are grouped into the second transaction, in the first slave system SLAVE1.

In the case where a preset abort information is included in the transaction information of respective first write data TRAN_WDATA which are stored in the write buffer A22 and are grouped into a third transaction, the first write data TRAN_WDATA which are grouped into the third transaction may be regarded as completely aborted. Therefore, when performing a flush operation for the write buffer A22, the master system A20 discards the first write data TRAN_WDATA which are stored in the write buffer A22 and are grouped into the third transaction.

For reference, each of the first write data TRAN_WDATA which are grouped into the first transaction may be in a state in which the transaction ID information of the transaction information thereof has a first value. Further, each of the first write data TRAN_WDATA which are grouped into the second transaction may be in a state in which the transaction ID information of the transaction information thereof has a second value. Moreover, each of the first write data TRAN_WDATA which are grouped into the third transaction may be in a state in which the transaction ID information of the transaction information thereof has a third value.

In this way, respective first write data TRAN_WDATA which are stored in the write buffer A22 are determined as different transaction groups depending on the transaction ID information of transaction information specified to particular values.

That is, a plurality of transaction groups may be mixed in the first write data TRAN_WDATA which are stored in the write buffer A22, a certain transaction group among the plurality of transaction groups may be a commit-completed state, a certain transaction group may be a commit-uncompleted state, and a certain transaction group may be an aborted state.

Figure 2A:
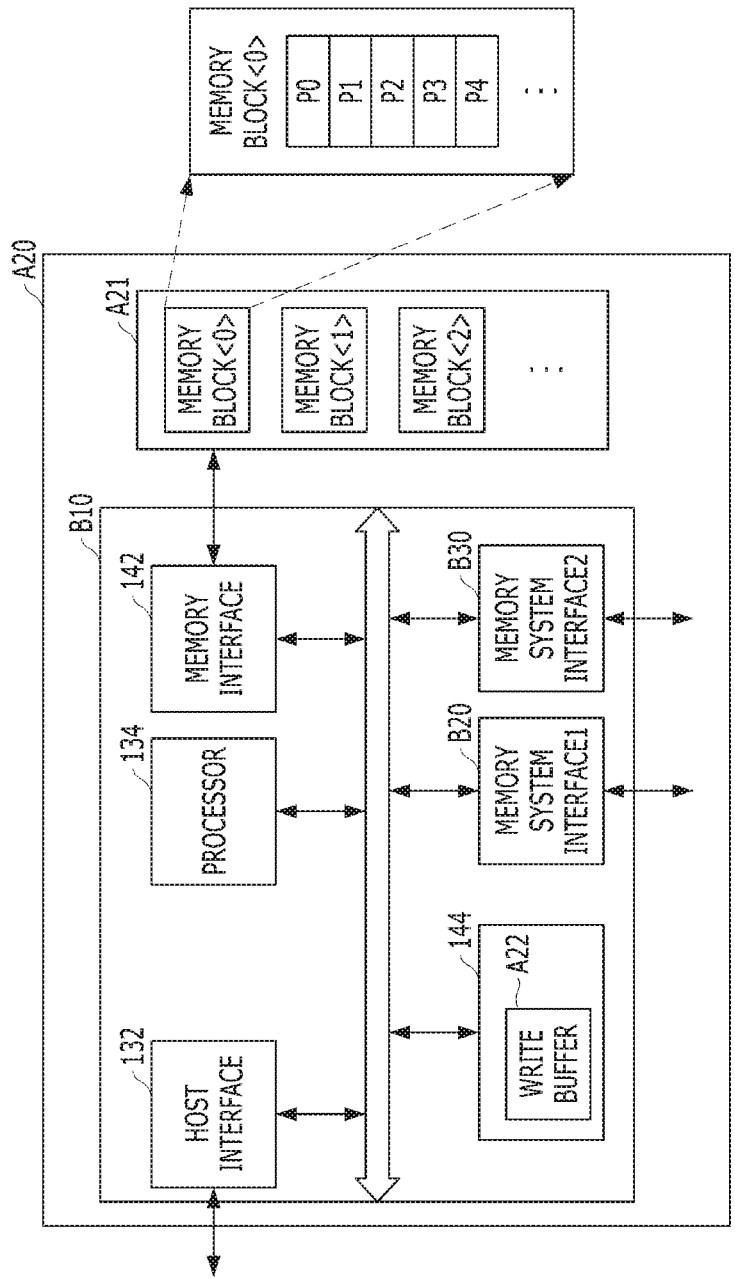

Referring to FIG. 2A, among the components of the data processing system described above with reference to FIG. 1, the detailed configuration of the master system A20 is shown.

First, the master system A20 includes a memory device which stores data to be accessed from the host A10, that is, the third nonvolatile memory device A21, and a master controller B10 which controls data storage to the third nonvolatile memory device A21.

The master controller B10 controls the third nonvolatile memory device A21 in response to a request from the host A10. For example, the master controller B10 provides data read from the third nonvolatile memory device A21 to the host A10, and stores data provided from the host A10 in the third nonvolatile memory device A21. To this end, the master controller B10 controls the operations of the third nonvolatile memory device A21, such as read, write, program and erase operations.

In detail, the master controller B10 includes a host interface unit (HOST INTERFACE) 132, a processor (PROCESSOR) 134, a memory interface unit (MEMORY INTERFACE) 142, a memory 144, a first memory system interface unit (MEMORY SYSTEM INTERFACE1) B20 and a second memory system interface unit (MEMORY SYSTEM INTERFACE2) B30.

The host interface unit 132 performs an operation of exchanging commands and data to be transferred between the master system A20 and the host A10, and may be configured to communicate with the host A10 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and MIPI (mobile industry processor interface). The host interface unit 32 may be driven through a firmware which is referred to as a host interface layer (HIL), as a region which exchanges data with the host MO.

The memory interface unit 142 serves as a memory/storage interface which performs interfacing between the master controller B10 and the third nonvolatile memory device A21, to allow the master controller B10 to control the third nonvolatile memory device A21 in response to a request from the host A10. The memory interface unit 142 generates control signals for the third nonvolatile memory device A21 and processes data under the control of the processor 134, as a NAND flash controller (NFC) in the case where the third nonvolatile memory device A21 is a flash memory, in particular, in the case where the third nonvolatile memory device A21 is a NAND flash memory.

The memory interface unit 142 may support the operation of an interface which processes a command and data between the master controller B10 and the third nonvolatile memory device A21, for example, a NAND flash interface, in particular, data input/output between the master controller B10 and the third nonvolatile memory device A21, and may be driven through a firmware which is referred to as a flash interface layer (FIL), as a region which exchanges data with the third nonvolatile memory device A21.

The first memory system interface unit B20 serves as a system interface which performs interfacing between the master system A20 and the first memory system A30, to allow the master controller B10 to control the operation of the first memory system A30. The first memory system interface unit B20 transfers a command and data to the first memory system A30 under the control of the processor 134.

The second memory system interface unit B30 serves as a system interface which performs interfacing between the master system A20 and the second memory system A40, to allow the master controller B10 to control the operation of the second memory system A40. The second memory system interface unit B30 transfers a command and data to the second memory system A40 under the control of the processor 134.

The memory 144 as the working memory of the master system A20 and the master controller B10 stores data for driving the master system A20 and the master controller B10. In detail, the memory 144 temporarily stores data which should be managed, when the master controller B10 controls the third nonvolatile memory device A21 in response to a request from the host A10, for example, when the master controller B10 controls the operations of the third nonvolatile memory device A21, such as read, write, program and erase operations. Also, the memory 144 temporarily stores data which should be managed, when the master controller B10 controls the operation of the first slave system SLAVE1 or the second slave system SLAVE2, for example, when the master controller B10 controls an operation of transmitting a command and data for the first slave system SLAVE1 or the second slave system SLAVE2.

The memory 144 may be realized by a volatile memory. For example, the memory 144 may be realized by a static random access memory (SRAM) or a dynamic random access memory (DRAM).

The memory 144 may be disposed inside the master controller B10 as illustrated in FIG. 2A, and may be disposed outside the master controller B10 unlike the illustration of FIG. 2A. In the case where the memory 144 is disposed outside the master controller B10 unlike the illustration of FIG. 2A, the memory 144 should be realized by an external volatile memory to and from which data are inputted and outputted from and to the master controller B10 through a separate memory interface (not shown).

The memory 144 stores data which should be managed in the course of controlling the operations of the third nonvolatile memory device A21, the first slave system SLAVE1 and the second slave system SLAVE2. For such data storage, the memory 144 may include a program memory, a data memory, a write buffer/cache, a read buffer/cache, a data buffer/cache, a map buffer/cache, and so forth. Thus, the write buffer A22 of the master system A20 for temporarily storing the plurality of write data WDATA inputted from the host A10 as described above may be included in the memory 144 as shown in FIG. 2A.

The processor 134 controls the entire operations of the master system A20, and in particular, controls a program operation or a read operation for the third nonvolatile memory device A21, in response to a write request or a read request from the host A10. The processor 134 drives a firmware which is referred to as a flash translation layer (FTL), to control general operations of the master system A20 for the third nonvolatile memory device A21. The processor 134 may be realized by a microprocessor or a central processing unit (CPU).

For instance, the master controller B10 performs an operation requested from the host A10, in the third nonvolatile memory device A21, that is, performs a command operation corresponding to a command received from the host A10, with the third nonvolatile memory device A21, through the processor 134 which is realized by a microprocessor or a central processing unit (CPU). The master controller B10 may perform a foreground operation as a command operation corresponding to a command received from the host A10, for example, a program operation corresponding to a write command, a read operation corresponding to a read command, an erase operation corresponding to an erase command or a parameter set operation corresponding to a set parameter command or a set feature command as a set command.

The master controller B10 may perform a background operation for the third nonvolatile memory device A21, through the processor 134 which is realized by a microprocessor or a central processing unit (CPU). The background operation for the third nonvolatile memory device A21 may include an operation of copying data stored in a certain memory block among memory blocks MEMORY BLOCK<0, 1, 2, . . . > of the third nonvolatile memory device A21, to another certain memory block, for example, a garbage collection (GC) operation. The background operation for the third nonvolatile memory device A21 may include an operation of swapping stored data among the memory blocks MEMORY BLOCK<0, 1, 2, . . . > of the third nonvolatile memory device A21, for example, a wear leveling (WL) operation. The background operation for the third nonvolatile memory device A21 may include an operation of storing map data stored in the master controller B10, in the memory blocks MEMORY BLOCK<0, 1, 2, . . . > of the third nonvolatile memory device A21, for example, a map flush operation. The background operation for the third nonvolatile memory device A21 may include a bad management operation for the third nonvolatile memory device A21, for example, a bad block management operation of checking and processing a bad block among the plurality of memory blocks MEMORY BLOCK<0, 1, 2, . . . > included in the third nonvolatile memory device A21.

The master controller B10 may generate and manage log data corresponding to an operation of accessing the memory blocks MEMORY BLOCK<0, 1, 2, . . . > of the third nonvolatile memory device A21, through the processor 134 which is realized by a microprocessor or a central processing unit (CPU). The operation of accessing the memory blocks MEMORY BLOCK<0, 1, 2, . . . > of the third nonvolatile memory device A21 includes performing a foreground operation or a background operation for the memory blocks MEMORY BLOCK<0, 1, 2, . . . > of the third nonvolatile memory device A21.

In the processor 134 of the master controller B10, a unit (not shown) for performing bad management of the third nonvolatile memory device A21 may be included. The unit for performing bad management of the third nonvolatile memory device A21 performs a bad block management of checking a bad block among the plurality of memory blocks MEMORY BLOCK<0, 1, 2, . . . > included in the third nonvolatile memory device A21 and processing the checked bad block as bad. The bad block management means that, in the case where the third nonvolatile memory device A21 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The master controller B10 performs an operation of transmitting a command and data to be inputted/outputted between the master system A20 and the first slave system SLAVE1 or the second slave system SLAVE2, through the processor 134 which is realized by a microprocessor or a central processing unit (CPU). The command and data to be inputted/outputted between the master system A20 and the first slave system SLAVE1 or the second slave system SLAVE2 may be transmitted from the host MO to the master system A20 or may be generated inside the master system A20.

The third nonvolatile memory device A21 in the master system A20 may retain stored data even though power is not supplied. In particular, the third nonvolatile memory device A21 in the master system A20 may store write data WDATA provided from the host MO, through a write operation, and may provide read data (not shown) stored therein, to the host MO, through a read operation.

While the third nonvolatile memory device A21 may be realized by a nonvolatile memory such as a flash memory, for example, a NAND flash memory, it is to be noted that the third nonvolatile memory device A21 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

The third nonvolatile memory device A21 includes the plurality of memory blocks MEMORY BLOCK<0, 1, 2, . . . >. In other words, the third nonvolatile memory device A21 may store write data WDATA provided from the host A10, in the memory blocks MEMORY BLOCK<0, 1, 2, . . . >, through a write operation, and may provide read data (not shown) stored in the memory blocks MEMORY BLOCK<0, 1, 2, . . . >, to the host A10, through a read operation.

Each of the memory blocks MEMORY BLOCK<0, 1, 2, . . . > included in the third nonvolatile memory device A21 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK<0, 1, 2, . . . > included in the third nonvolatile memory device A21 may be classified as a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

Figure 2B:
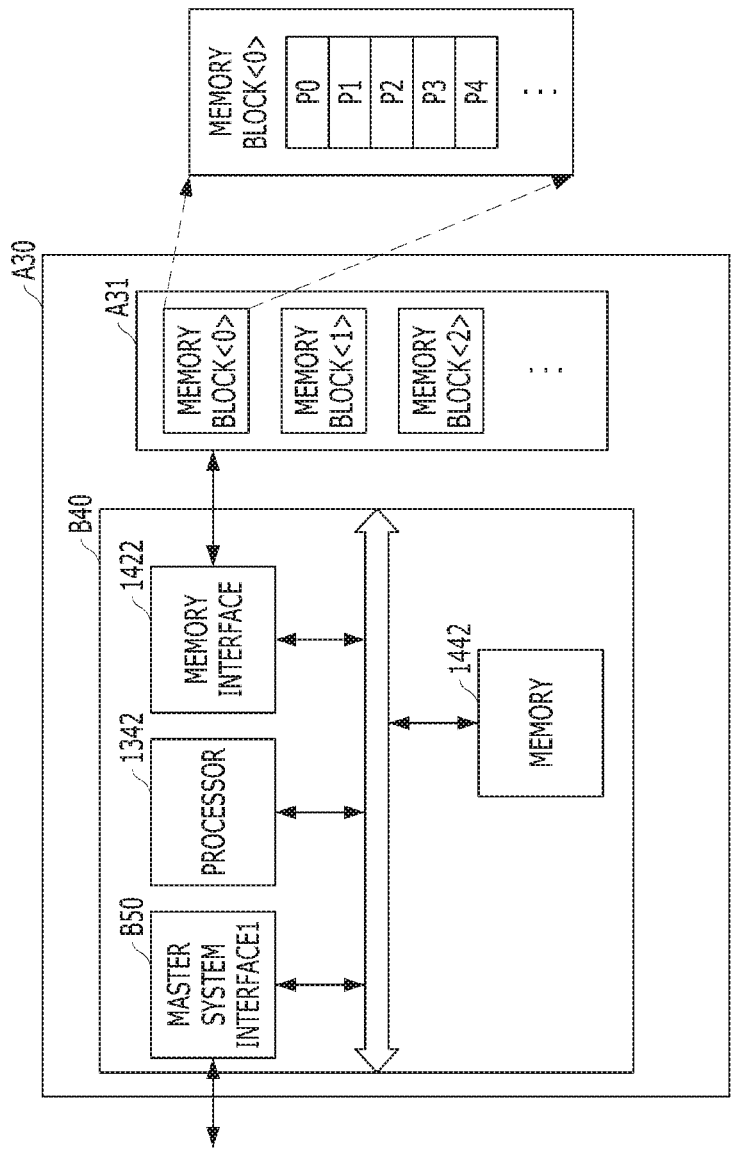

Referring to FIG. 2B, among the components of the data processing system described above with reference to FIG. 1, the detailed configuration of the first memory system A30 is shown.

First, the first memory system A30 includes a memory device which stores data to be accessed from the master system A20, that is, the first nonvolatile memory device A31, and a first controller B40 which controls data storage to the first nonvolatile memory device A31.

The first controller B40 controls the first nonvolatile memory device A31 in response to a request from the master system A20. For example, the first controller B40 provides data read from the first nonvolatile memory device A31, to the master system A20, and stores data provided from the master system A20, in the first nonvolatile memory device A31. To this end, the first controller B40 controls the operations of the first nonvolatile memory device A31, such as read, write, program and erase operations.

In detail, the first controller B40 includes a first master system interface unit (MASTER SYSTEM INTERFACE1) B50, a processor (PROCESSOR) 1342, a memory interface unit (MEMORY INTERFACE) 1422 and a memory (MEMORY) 1442.

The first master system interface unit B50 performs an operation of exchanging a command and data to be transferred between the first memory system A30 and the master system A20. To this end, the first master system interface unit B50 is coupled with the first memory system interface unit B20 in the master system A20.

The memory interface unit 1422 serves as a memory/ storage interface which performs interfacing between the first controller B40 and the first nonvolatile memory device A31, to allow the first controller B40 to control the first nonvolatile memory device A31 in response to a request from the master system A20. The memory interface unit 1422 generates control signals for the first nonvolatile memory device A31 and processes data under the control of the processor 1342, as a NAND flash controller (NFC) in the case where the first nonvolatile memory device A31 is a flash memory, in particular, in the case where the first nonvolatile memory device A31 is a NAND flash memory.

The memory interface unit 1422 may support the operation of an interface which processes a command and data between the first controller B40 and the first nonvolatile memory device A31, for example, a NAND flash interface, in particular, data input/output between the first controller B40 and the first nonvolatile memory device A31, and may be driven through a firmware which is referred to as a flash interface layer (FIL), as a region which exchanges data with the first nonvolatile memory device A31.

The memory 1442 as the working memory of the first memory system A30 and the first controller B40 stores data for driving the first memory system A30 and the first controller B40. In detail, the memory 1442 temporarily stores data which should be managed, when the first controller B40 controls the first nonvolatile memory device A31 in response to a request from the master system A20, for example, when the first controller B40 controls the operations of the first nonvolatile memory device A31, such as read, write, program and erase operations.

The memory 1442 may be realized by a volatile memory. For example, the memory 1442 may be realized by a static random access memory (SRAM) or a dynamic random access memory (DRAM).

The memory 1442 may be disposed inside the first controller B40 as illustrated in FIG. 2B, and may be disposed outside the first controller B40 unlike the illustration of FIG. 2B. In the case where the memory 1442 is disposed outside the first controller B40 unlike the illustration of FIG. 26, the memory 1442 should be realized by an external volatile memory to and from which data are inputted and outputted from and to the first controller B40 through a separate memory interface (not shown).

The memory 1442 stores data which should be managed in the course of controlling the operation of the first nonvolatile memory device A31. For such data storage, the memory 1442 may include a program memory, a data memory, a write buffer/cache, a read buffer/cache, a data buffer/cache, a map buffer/cache, and so forth. Thus, a plurality of write data WDATA which are inputted from the master system A20 may be temporarily stored in the memory 1442 until they are programmed to the first nonvolatile memory device A31.

The processor 1342 controls the entire operations of the first memory system A30, and in particular, controls a program operation or a read operation for the first nonvolatile memory device A31, in response to a write request or a read request from the master system A20. The processor 1342 drives a firmware which is referred to as a flash translation layer (FTL), to control general operations of the first memory system A30 for the first nonvolatile memory device A31. The processor 1342 may be realized by a microprocessor or a central processing unit (CPU).

For instance, the first controller B40 performs an operation requested from the master system A20, in the first nonvolatile memory device A31, that is, performs a command operation corresponding to a command received from the master system A20, with the first nonvolatile memory device A31, through the processor 1342 which is realized by a microprocessor or a central processing unit (CPU). The first controller B40 may perform a foreground operation as a command operation corresponding to a command received from the master system A20, for example, a program operation corresponding to a write command, a read operation corresponding to a read command, an erase operation corresponding to an erase command or a parameter set operation corresponding to a set parameter command or a set feature command as a set command.

The first controller B40 may perform a background operation for the first nonvolatile memory device A31, through the processor 1342 which is realized by a microprocessor or a central processing unit (CPU). The background operation for the first nonvolatile memory device A31 may include an operation of copying data stored in a certain memory block among memory blocks MEMORY BLOCK<0, 1, 2, . . . > of the first nonvolatile memory device A31, to another certain memory block, for example, a garbage collection (GC) operation. The background operation for the first nonvolatile memory device A31 may include an operation of swapping stored data among the memory blocks MEMORY BLOCK<0, 1, 2, . . . > of the first nonvolatile memory device A31, for example, a wear leveling (WL) operation. The background operation for the first nonvolatile memory device A31 may include an operation of storing map data stored in the first controller B40, in the memory blocks MEMORY BLOCK<0, 1, 2, . . . > of the first nonvolatile memory device A31, for example, a map flush operation. The background operation for the first nonvolatile memory device A31 may include a bad management operation for the first nonvolatile memory device A31, for example, a bad block management operation of checking and processing a bad block among the plurality of memory blocks MEMORY BLOCK<0, 1, 2, . . . > included in the first nonvolatile memory device A31.

The first controller B40 may generate and manage log data corresponding to an operation of accessing the memory blocks MEMORY BLOCK<0, 1, 2, . . . > of the first nonvolatile memory device A31, through the processor 1342 which is realized by a microprocessor or a central processing unit (CPU). The operation of accessing the memory blocks MEMORY BLOCK<0, 2, . . . > of the first nonvolatile memory device A31 includes performing a foreground operation or a background operation for the memory blocks MEMORY BLOCK<0, 1, 2, . . . > of the first nonvolatile memory device A31.

In the processor 1342 of the first controller B40, a unit (not shown) for performing bad management of the first nonvolatile memory device A31 may be included. The unit for performing bad management of the first nonvolatile memory device A31 performs a bad block management of checking a bad block among the plurality of memory blocks MEMORY BLOCK<0, 1, 2, . . . > included in the first nonvolatile memory device A31 and processing the checked bad block as bad. The bad block management means that, in the case where the first nonvolatile memory device A31 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The first nonvolatile memory device A31 in the first memory system A30 may retain stored data even though power is not supplied. In particular, the first nonvolatile memory device A31 in the first memory system A30 may store write data WDATA provided from the master system A20, through a write operation, and may provide read data (not shown) stored therein, to the master system A20, through a read operation.

While the first nonvolatile memory device A31 may be realized by a nonvolatile memory such as a flash memory, for example, a NAND flash memory, it is to be noted that the first nonvolatile memory device A31 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

The first nonvolatile memory device A31 includes the plurality of memory blocks MEMORY BLOCK<0, 1, 2, . . . >. In other words, the first nonvolatile memory device A31 may store write data WDATA provided from the master system A20, in the memory blocks MEMORY BLOCK<0, 1, 2, . . . >, through a write operation, and may provide read data (not shown) stored in the memory blocks MEMORY BLOCK<0, 1, 2, . . . >, to the master system A20, through a read operation.

Each of the memory blocks MEMORY BLOCK<0, 1, 2, . . . > included in the first nonvolatile memory device A31 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK<0, 1, 2, . . . > included in the first nonvolatile memory device A31 may be classified as a single level cell (SLC) memory block or a multi-level cell (MLC) memory block, depending on the number of bits which may be stored or expressed in one memory cell included therein. A SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

Referring to FIG. 2C, among the components of the data processing system described above with reference to FIG. 1, the detailed configuration of the second memory system A40 is shown.

First, the second memory system A40 includes a memory device which stores data to be accessed from the master system A20, that is, the second nonvolatile memory device A41, and a second controller B60 which controls data storage to the second nonvolatile memory device A41.

The second controller B60 controls the second nonvolatile memory device A41 in response to a request from the master system A20. For example, the second controller B60 provides data read from the second nonvolatile memory device A41, to the master system A20, and stores data provided from the master system A20, in the second nonvolatile memory device A41. To this end, the second controller B60 controls the operations of the second nonvolatile memory device A41, such as read, write, program and erase operations.

In detail, the second controller B60 includes a second master system interface unit (MASTER SYSTEM INTERFACE2) B70, a processor (PROCESSOR) 1343, a memory interface unit (MEMORY INTERFACE) 1423 and a memory (MEMORY) 1443.

The second master system interface unit B70 performs an operation of exchanging a command and data to be transferred between the second memory system A40 and the master system A20. To this end, the second master system interface unit B70 is coupled with the second memory system interface unit B30 in the master system A20.

The memory interface unit 1423 serves as a memory/storage interface which performs interfacing between the second controller B60 and the second nonvolatile memory device A41, to allow the second controller B60 to control the second nonvolatile memory device A41 in response to a request from the master system A20. The memory interface unit 1423 generates control signals for the second nonvolatile memory device A41 and processes data under the control of the processor 1343, as a NAND flash controller (NFC) in the case where the second nonvolatile memory device A41 is a flash memory, in particular, in the case where the second nonvolatile memory device A41 is a NAND flash memory.

The memory interface unit 1423 may support the operation of an interface which processes a command and data between the second controller B60 and the second nonvolatile memory device A41, for example, a NAND flash interface, in particular, data input/output between the second controller B60 and the second nonvolatile memory device A41, and may be driven through a firmware which is referred to as a flash interface layer (FIL), as a region which exchanges data with the second nonvolatile memory device A41.

The memory 1443 as the working memory of the second memory system A40 and the second controller B60 stores data for driving the second memory system A40 and the second controller B60. In detail, the memory 1443 temporarily stores data which should be managed, when the second controller B60 controls the second nonvolatile memory device A41 in response to a request from the master system A20, for example, when the second controller B60 controls the operations of the second nonvolatile memory device A41, such as read, write, program and erase operations.

The memory 1443 may be realized by a volatile memory. For example, the memory 1443 may be realized by a static random access memory (SRAM) or a dynamic random access memory (DRAM).

The memory 1443 may be disposed inside the second controller B60 as illustrated in FIG. 2C, and may be disposed outside the second controller B60 unlike the illustration of FIG. 2C. In the case where the memory 1443 is disposed outside the second controller B60 unlike the illustration of FIG. 2C, the memory 1443 should be realized by an external volatile memory to and from which data are inputted and outputted from and to the second controller B60 through a separate memory interface (not shown).

The memory 1443 stores data which should be managed in the course of controlling the operation of the second nonvolatile memory device A41. For such data storage, the memory 1443 may include a program memory, a data memory, a write buffer/cache, a read buffer/cache, a data buffer/cache, a map buffer/cache, and so forth. Thus, a plurality of write data WDATA which are inputted from the master system A20 may be temporarily stored in the memory 1443 until they are programmed to the second nonvolatile memory device A41.

The processor 1343 controls the entire operations of the second memory system A40, and in particular, controls a program operation or a read operation for the second nonvolatile memory device A41, in response to a write request or a read request from the master system A20. The processor 1343 drives a firmware which is referred to as a flash translation layer (FTL), to control general operations of the second memory system A40 for the second nonvolatile memory device A41. The processor 1343 may be realized by a microprocessor or a central processing unit (CPU).

For instance, the second controller B60 performs an operation requested from the master system A20, in the second nonvolatile memory device A41, that is, performs a command operation corresponding to a command received from the master system A20, with the second nonvolatile memory device A41, through the processor 1343 which is realized by a microprocessor or a central processing unit (CPU). The second controller B60 may perform a foreground operation as a command operation corresponding to a command received from the master system A20, for example, a program operation corresponding to a write command, a read operation corresponding to a read command, an erase operation corresponding to an erase command or a parameter set operation corresponding to a set parameter command or a set feature command as a set command.

The second controller B60 may perform a background operation for the second nonvolatile memory device A41, through the processor 1343 which is realized by a microprocessor or a central processing unit (CPU). The background operation for the second nonvolatile memory device A41 may include an operation of copying the data stored in a certain memory block among memory blocks MEMORY BLOCK<0, 1, 2, . . . > of the second nonvolatile memory device A41, to another certain memory block, for example, a garbage collection (GC) operation. The background operation for the second nonvolatile memory device A41 may include an operation of swapping stored data among the memory blocks MEMORY BLOCK<0, 1, 2, . . . > of the second nonvolatile memory device A41, for example, a wear leveling (WL) operation. The background operation for the second nonvolatile memory device A41 may include an operation of storing map data stored in the second controller 360, in the memory blocks MEMORY BLOCK<0, 1, 2, . . . > of the second nonvolatile memory device A41, for example, a map flush operation. The background operation for the second nonvolatile memory device A41 may include a bad management operation for the second nonvolatile memory device A41, for example, a bad block management operation of checking and processing a bad block among the plurality of memory blocks MEMORY BLOCK<0, 1, 2, . . . > included in the second nonvolatile memory device A41.

The second controller B60 may generate and manage log data corresponding to an operation of accessing the memory blocks MEMORY BLOCK<0, 1, 2, . . . > of the second nonvolatile memory device A41, through the processor 1343 which is realized by a microprocessor or a central processing unit (CPU). The operation of accessing the memory blocks MEMORY BLOCK<0, 1, 2, . . . > of the second nonvolatile memory device A41 includes performing of a foreground operation or a background operation for the memory blocks MEMORY BLOCK<0, 1, 2, . . . > of the second nonvolatile memory device A41.

In the processor 1343 of the second controller B60, a unit (not shown) for performing bad management of the second nonvolatile memory device A41 may be included. The unit for performing bad management of the second nonvolatile memory device A41 performs a bad block management of checking a bad block among the plurality of memory blocks MEMORY BLOCK<0, 1, 2, . . . > included in the second nonvolatile memory device A41 and processing the checked bad block as bad. The bad block management means that, in the case where the second nonvolatile memory device A41 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The second nonvolatile memory device A41 in the second memory system A40 may retain stored data even though power is not supplied. In particular, the second nonvolatile memory device A41 in the second memory system A40 may store write data WDATA provided from the master system A20, through a write operation, and may provide read data (not shown) stored therein, to the master system A20, through a read operation.

While the second nonvolatile memory device A41 may be realized by a nonvolatile memory such as a flash memory, for example, a NAND flash memory, it is to be noted that the second nonvolatile memory device A41 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

The second nonvolatile memory device A41 includes the plurality of memory blocks MEMORY BLOCK<0, 1, 2, . . . >. In other words, the second nonvolatile memory device A41 may store write data WDATA provided from the master system A20, in the memory blocks MEMORY BLOCK<0, 1, 2, . . . >, through a write operation, and may provide read data (not shown) stored in the memory blocks MEMORY BLOCK<0, 1, 2, . . . >, to the master system A20, through a read operation.

Each of the memory blocks MEMORY BLOCK<0, 1, 2, . . . > included in the second nonvolatile memory device A41 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK<0, 1, 2, . . . > included in the second nonvolatile memory device A41 may be classified as a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability, An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

FIGS. 3A to 3E are diagrams of the operation of the data processing system including a plurality of memory systems in accordance with the first embodiment of the present disclosure.

FIGS. 3A to 3E are diagrams which are shown to describe the characterizing operation of the present disclosure by referring to the configuration of the data processing system including a plurality of memory systems in accordance with the first embodiment of the present disclosure described above with reference to FIGS. 1 and 2A to 2C.

First, in FIGS. 3A to 3E to be described below, descriptions will be made hereunder by defining first write data TRAN_WDATA of which transaction ID information have a first value, that is, first write data TRAN_WDATA which are grouped into a first transaction, as first transaction data TRAN_WDATA1. Also, descriptions will be made hereunder by defining first write data TRAN_WDATA of which transaction ID information have a second value, that is, first write data TRAN_WDATA which are grouped into a second transaction, as second transaction data TRAN_WDATA2. Further, descriptions will be made hereunder by defining first write data TRAN_WDATA of which transaction ID information have a third value, that is, first write data TRAN_WDATA which are grouped into a third transaction, as third transaction data TRAN_WDATA3. Referring to FIGS. 3A to 3E, it may be seen that spaces in which a total of 10 write data WDATA may be stored, exist in the write buffer A22.

In addition, in FIGS. 3A to 3E to be described below, the master system A20 classifies the first memory system A30 as the first slave system SLAVE1 and classifies the second memory system A40 as the second slave system SLAVE2.

Referring to FIG. 3A, it may be seen that 0, 1 and 2 as the first transaction data TRAN_WDATA1, 110, 111, 112 and 113 as the second transaction data TRAN_WDATA2, and A, B and C as the second write data NMAL_WDATA are stored in the write buffer A22.

First, the master system A20 classifies 0, 1 and 2 as write data WDATA of which transaction ID information have the first value, among the write data WDATA stored in the write buffer A22, into the first transaction data TRAN_WDATA1. By checking that a preset commit information and a preset abort information are not included in 0, 1 and 2 as the first transaction data TRAN_WDATA1 stored in the write buffer A22, the master system A20 may be aware that it is in a transaction-uncompleted state in which the commit of the first transaction is not completed.

The master system A20 classifies 110, 111, 112 and 113 as write data WDATA of which transaction ID information have the second value, among the write data WDATA stored in the write buffer A22, into the second transaction data TRAN_WDATA2. By checking that a preset commit information is included in 110, 111, 112 and 113 as the second transaction data TRAN_WDATA2, the master system A20 may be aware of that it is in a transaction-completed state in which the commit of the second transaction is completed.

The master system A20 checks whether start data of the second transaction is included in the entire second transaction data TRAN_WDATA2 stored in the write buffer A22, when checking that it is in a state in which the commit of the second transaction data TRAN_WDATA2 is completed. It may be assumed that the start data of the second transaction data TRAN_WDATA2 is 110. That is, the master system A20 may check that 110 as the start data is included in 110, 111, 112 and 113 as the second transaction data TRAN_WDATA2 which are stored in the write buffer A22.

The master system A20 classifies A, B and C as write data WDATA of which transaction ID information are not set, among the write data WDATA stored in the write buffer A22, into the second write data NMAL_WDATA.

In this way, by checking transaction ID information corresponding to the respective write data WDATA stored in the write buffer A22, the master system A20 classifies the write data WDATA into the first transaction data TRAN_WDATA1, the second transaction data TRAN_WDATA2 and the second write data NMAL_WDATA.

Then, at a time of performing a flush operation for the write buffer A22, the master system A20 transfers the first transaction data TRAN_WDATA1 which are transaction-uncompleted, to the first slave system SLAVE1, and thereby, stores the first transaction data TRAN_WDATA1 in the nonvolatile memory device included in the first slave system SLAVE1. In other words, the master system A20 transfers 0, 1 and 2 as the first transaction data TRAN_WDATA1 to the first memory system A30 which is selected as the first slave system SLAVE1. Accordingly, the first memory system A30 stores 0, 1 and 2 as the first transaction data TRAN_WDATA1 transferred from the master system A20, in the first nonvolatile memory device A31 included therein.

The master system A20 has checked that the start data is included in the second transaction data TRAN_WDATA2 which are transaction-completed. Therefore, at the time of performing the flush operation for the write buffer A22, the master system A20 transfers all of the second transaction data TRAN_WDATA2 which are stored in the write buffer A22 and are transaction-completed, to the second slave system SLAVE2, and thereby, stores them in the nonvolatile memory device included in the second slave system SLAVE2. Namely, the master system A20 transfers 110, 111, 112 and 113 as all of the second transaction data TRAN_WDATA2 stored in the write buffer A22, to the second memory system A40 which is selected as the second slave system SLAVE2. Accordingly, the second memory system A40 stores 110, 111, 112 and 113 as the second transaction data TRAN_WDATA2 transferred from the master system A20, in the second nonvolatile memory device A41 included therein.

Also, when performing the flush operation for the write buffer A22, the master system A20 stores A, B and C as the second write data NMAL_WDATA which are not grouped into a transaction, in the third nonvolatile memory device A21 included therein.

Figure 3B:
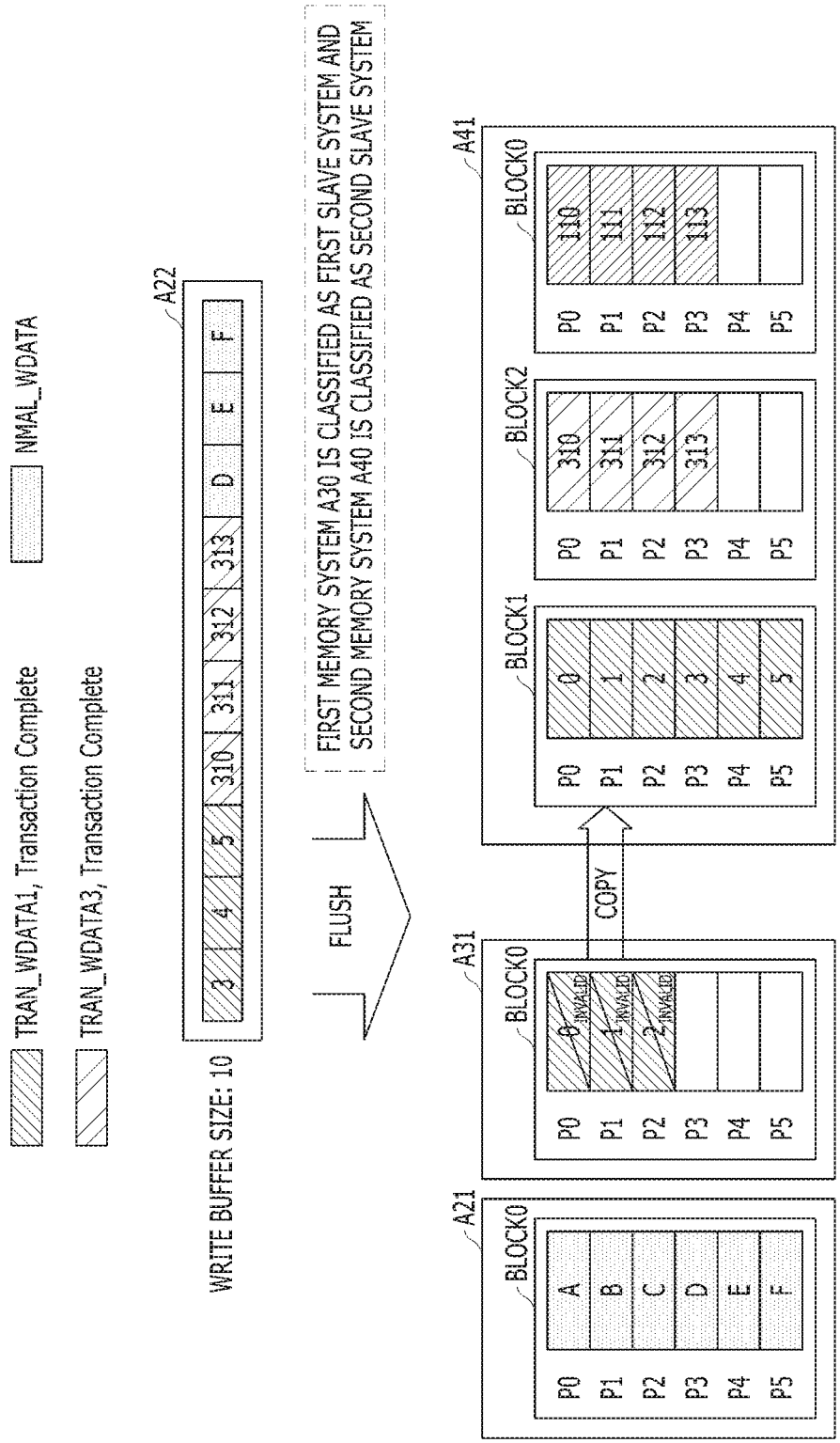

Referring to FIG. 3B, as a result of the flush operation for the write buffer A22 described above with reference to FIG. 3A, it is a state in which 0, 1 and 2 as the first transaction data TRAN_WDATA1 are stored in the first nonvolatile memory device A31 of the first memory system A30 selected as the first slave system SLAVE1. Also, as a result of the flush operation for the write buffer A22 described above with reference to FIG. 3A, it is a state in which the second transaction data TRAN_WDATA2 are stored in the second nonvolatile memory device A41 of the second memory system A40 selected as the second slave system SLAVE2. Moreover, as a result of the flush operation for the write buffer A22 described above with reference to FIG. 3A, it is a state in which the second write data NMAL_WDATA which are not grouped into a transaction are stored in the third nonvolatile memory device A21.

In this state, it may be seen that 3, 4 and 5 as first transaction data TRAN_WDATA1, 310, 311, 312 and 313 as third transaction data TRAN_WDATA3 and D, E and F as second write data NMAL_WDATA are stored in the write buffer A22.

First, the master system A20 classifies 3, 4 and 5 as write data WDATA of which transaction ID information have the first value, among the write data WDATA stored in the write buffer A22, into the first transaction data TRAN_WDATA1. By checking that a preset commit information is included in 3, 4 and 5 as the first transaction data TRAN_WDATA1 stored in the write buffer A22, the master system A20 may be aware that it is a transaction-completed state in which the commit of the first transaction is completed.

The master system A20 checks whether start data is included in the entire first transaction data TRAN_WDATA1 stored in the write buffer A22, at a time of checking that it is a state in which the commit of the first transaction data TRAN_WDATA1 is completed. The start data of the first transaction data TRAN_WDATA1 is 0 described above with reference to FIG. 3A. That is, the master system A20 may check that 0 as the start data is not included in 3, 4 and 5 as the first transaction data TRAN_WDATA1 which are stored in the write buffer A22.

The master system A20 classifies 310, 311, 312 and 313 as write data WDATA of which transaction ID information have the third value, among the write data WDATA stored in the write buffer A22, into the third transaction data TRAN_WDATA3. By checking that a preset commit information is included in 310, 311, 312 and 313 as the third transaction data TRAN_WDATA3, the master system A20 may be aware that it is a transaction-completed state in which the commit of the third transaction is completed.

The master system A20 checks whether start data is included in the entire third transaction data TRAN_WDATA3 stored in the write buffer A22, at a time of checking that it is a state in which the commit of the third transaction data TRAN_WDATA3 is completed. That is, the start data of the third transaction data TRAN_WDATA3 is 310. Moreover, the master system A20 may check that 310 as the start data is included in 310, 311, 312 and 313 as the third transaction data TRAN_WDATA3 which are stored in the write buffer A22.

The master system A20 classifies D, E and F as write data WDATA of which transaction ID information are not set, among the write data WDATA stored in the write buffer A22, into the second write data NMAL_WDATA.

In this way, by checking transaction ID information corresponding to the respective write data WDATA stored in the write buffer A22, the master system A20 classifies the write data WDATA into the first transaction data TRAN_WDATA1, the third transaction data TRAN_WDATA3 and the second write data NMAL_WDATA.

The master system A20 has checked that the start data is not included in the first transaction data TRAN_WDATA1 stored in the write buffer A22. Therefore, when performing a flush operation for the write buffer A22, the master system A20 receives remaining data (including the start data 0) of the first transaction data TRAN_WDATA1, transferred from the first slave system SLAVE1, stores the received data in the second slave system SLAVE2, and then stores all of the first transaction data TRAN_WDATA1 which are stored in the write buffer A22, in the second slave system SLAVE2.

In detail, the master system A20 requests the remaining data (including the start data 0) of the first transaction data TRAN_WDATA1, to the first memory system A30 selected as the first slave system SLAVE1. Accordingly, the first memory system A30 reads 0, 1 and 2 as the remaining data of the first transaction data TRAN_WDATA1, from the first nonvolatile memory device A31, and transfers the remaining data to the master system A20. After reading 0, 1 and 2 as the remaining data of the first transaction data TRAN_WDATA1 and transferring the remaining data to the master system A20, the first memory system A30 invalidates 0, 1 and 2 as the remaining data of the first transaction data TRAN_WDATA1 in the first nonvolatile memory device A31.

In succession, the master system A20 transfers 0, 1 and 2 as the remaining data of the first transaction data TRAN_WDATA1 which are transferred from the first memory system A30, to the second memory system A40 selected as the second slave system SLAVE2. Accordingly, the second memory system A40 stores 0, 1 and 2 as the remaining data of the first transaction data TRAN_WDATA1 transferred from the master system A20, in the second nonvolatile memory device A41 included therein.

Then, the master system A20 transfers 3, 4 and 5 as all of the first transaction data TRAN_WDATA1 stored in the write buffer A22, to the second memory system A40. Accordingly, the second memory system A40 stores 3, 4 and 5 as the first transaction data TRAN_WDATA1 transferred from the master system A20, in the second nonvolatile memory device A41 included therein.

Thus, 0, 1, 2, 3, 4 and 5 as all of the first transaction data TRAN_WDATA1 may be stored in the second nonvolatile memory device A41.

The master system A20 has checked that the start data is included in the third transaction data TRAN_WDATA3 which are transaction-completed. Therefore, at the time of performing the flush operation for the write buffer A22, the master system A20 transfers all of the third transaction data TRAN_WDATA3 which are stored in the write buffer A22 and are transaction-completed, to the second slave system SLAVE2, and thereby, stores the all of the third transaction data TRAN_WDATA3 in the nonvolatile memory device included in the second slave system SLAVE2. Namely, the master system A20 transfers 310, 311, 312 and 313 as all of the third transaction data TRAN_WDATA3 stored in the write buffer A22, to the second memory system A40 selected as the second slave system SLAVE2. Thus, the second memory system A40 stores 310, 311, 312 and 313 as the third transaction data TRAN_WDATA3 transferred from the master system A20, in the second nonvolatile memory device A41 included therein.

Also, at the time of performing the flush operation for the write buffer A22, the master system A20 stores D, E and F as the second write data NMAL_WDATA which are not grouped into a transaction, in the third nonvolatile memory device A21 included therein.

Figure 3C:
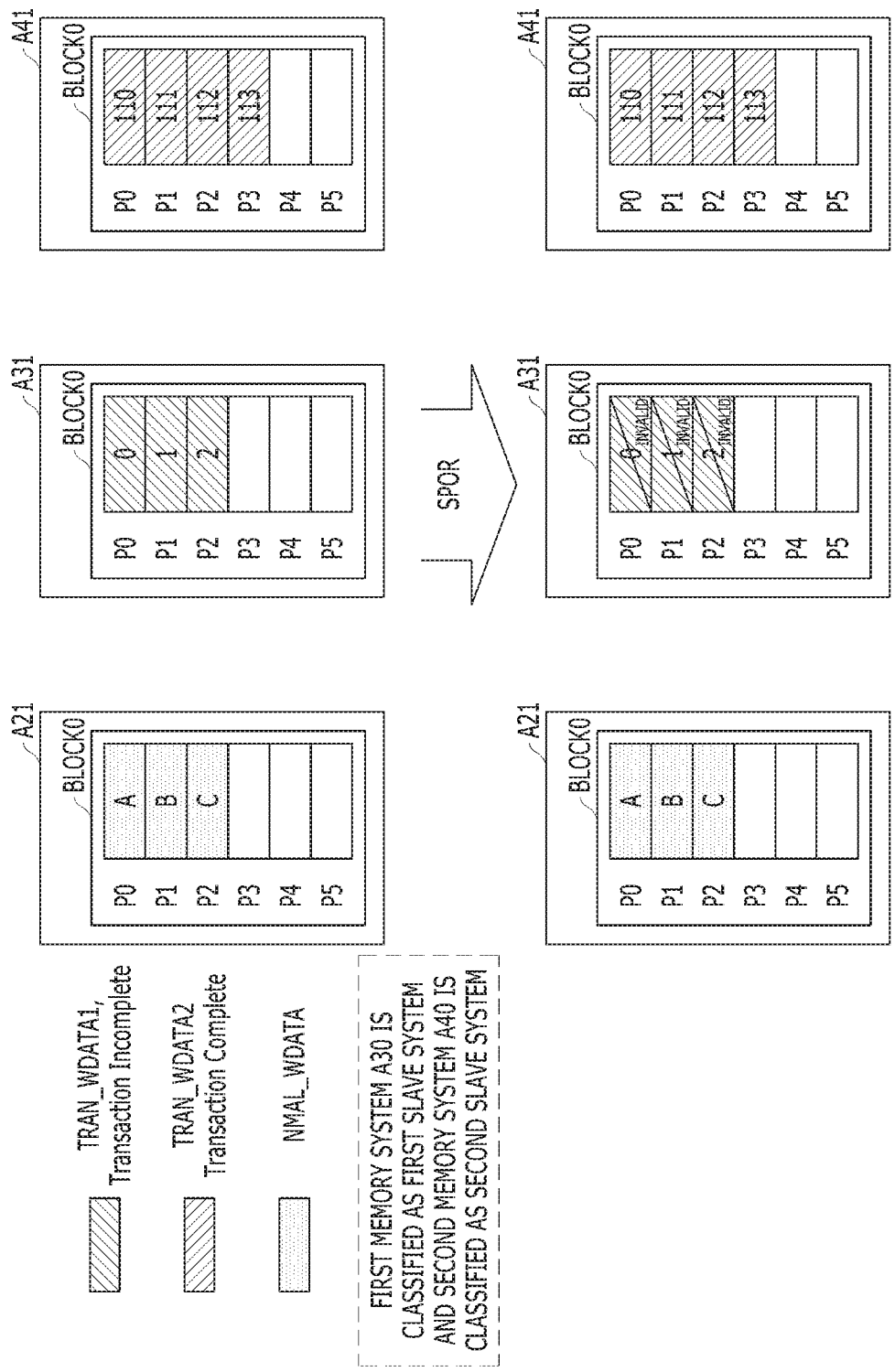

Referring to FIG. 3C, as a result of the flush operation for the write buffer A22 described above with reference to FIG. 3A, it is a state in which 0, 1 and 2 as the first transaction data TRAN_WDATA1 are stored in the first nonvolatile memory device A31 of the first memory system A30 selected as the first slave system SLAVE1. Also, as a result of the flush operation for the write buffer A22 described above with reference to FIG. 3A, it is a state in which the second transaction data TRAN_WDATA2 are stored in the second nonvolatile memory device A41 of the second memory system A40 selected as the second slave system SLAVE2. Moreover, as a result of the flush operation for the write buffer A22 described above with reference to FIG. 3A, it is a state in which the second write data NMAL_WDATA which are not grouped into a transaction are stored in the third nonvolatile memory device A21.

In this state, if power is supplied again after a sudden power-off (SPO) occurs in the data processing system, the master system A20 enters a sudden power-off recovery (SPOR) period for a recovery operation.

In the SPOR period, the master system A20 invalidates all data stored in the nonvolatile memory device included in the first slave system SLAVE1, through the first slave system SLAVE1. In succession, the master system A20 transfers information on the transaction corresponding to the invalided data stored in the first slave system SLAVE1, to the host M0.

In detail, in the SPOR period, the master system A20 requests data invalidation to the first memory system A30 selected as the first slave system SLAVE1. Due to this fact, the first memory system A30 invalidates all of the data stored in the first nonvolatile memory device A31 included therein, that is, 0, 1 and 2 as the remaining data of the first transaction data TRAN_WDATA1. In this way, after the remaining data of the first transaction data TRAN_WDATA1 stored in the first nonvolatile memory device A31 are invalidated through the first memory system A30, the master system A20 transfers an information that the first transaction is not ensured, to the host A10.

Figure 3D:
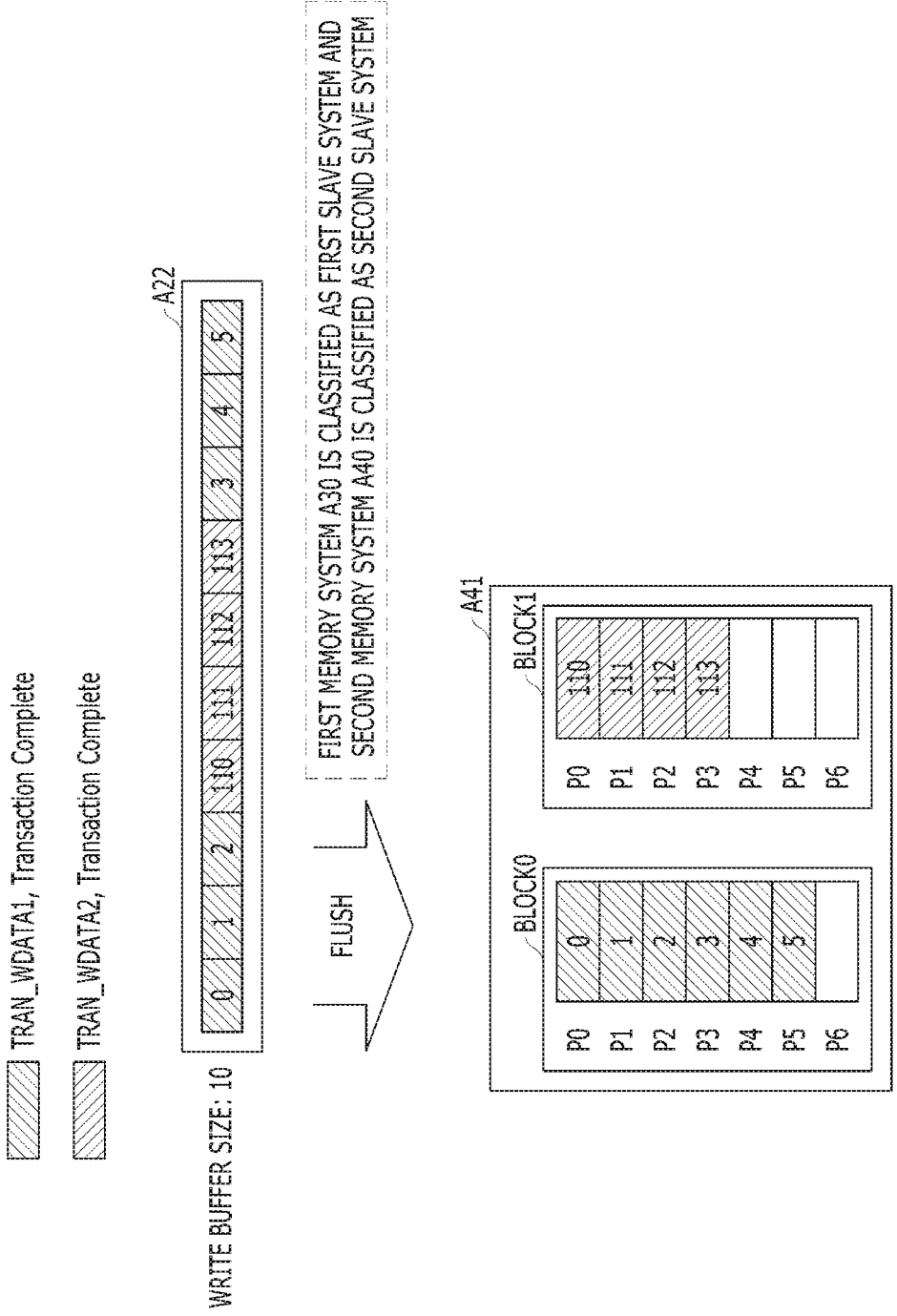

Referring to FIG. 3D, it may be seen that 0, 1, 2, 3, 4 and 5 as first transaction data TRAN_WDATA1 and 110, 111, 112 and 113 as second transaction data TRAN_WDATA2 are stored in the write buffer A22.

First, the master system A20 classifies 0, 1, 2, 3, 4 and 5 as write data WDATA of which transaction ID information have the first value, among the write data WDATA stored in the write buffer A22, into the first transaction data TRAN_WDATA1. By checking that a preset commit information is included in 0, 1, 2, 3, 4 and 5 as the first transaction data TRAN_WDATA1 stored in the write buffer A22, the master system A20 may be aware that it is a transaction-completed state in which the commit of the first transaction is completed.

The master system A20 checks whether start data is included in the entire first transaction data TRAN_WDATA1 stored in the write buffer A22, at a time of checking that it is a state in which the commit of the first transaction data TRAN_WDATA1 is completed. It may be assumed that the start data of the first transaction data TRAN_WDATA1 is 0. That is, the master system A20 may check that 0 as the start data is included in 0, 1, 2, 3, 4 and 5 as the first transaction data TRAN_WDATA1 which are stored in the write buffer A22.

The master system A20 classifies 110, 111, 112 and 113 as write data WDATA of which transaction ID information have the second value, among the write data WDATA stored in the write buffer A22, into the second transaction data TRAN_WDATA2. By checking that a preset commit information is included in 110, 111, 112 and 113 as the second transaction data TRAN_WDATA2, the master system A20 may be aware of that it is a transaction-completed state in which the commit of the second transaction is completed.

The master system A20 checks whether start data is included in the entire second transaction data TRAN_WDATA2 stored in the write buffer A22, at a time of checking that it is a state in which the commit of the second transaction data TRAN_WDATA2 is completed. It may be assumed that the start data of the second transaction data TRAN_WDATA2 is 110. That is, the master system A20 may check that 110 as the start data is included in 110, 111, 112 and 113 as the second transaction data TRAN_WDATA2 which are stored in the write buffer A22.

In this way, by checking transaction ID information corresponding to the respective write data WDATA stored in the write buffer A22, the master system A20 classifies the write data WDATA into the first transaction data TRAN_WDATA1 and the second transaction data TRAN_WDATA2.

The master system A20 has checked that the start data is included in the first transaction data TRAN_WDATA1 which are transaction-completed. Therefore, when performing a flush operation for the write buffer A22, the master system A20 transfers all of the first transaction data TRAN_WDATA1 which are stored in the write buffer A22 and are transaction-completed, to the second slave system SLAVE2, and thereby, stores them in the nonvolatile memory device included in the second slave system SLAVE2. Namely, the master system A20 transfers 0, 1, 2, 3, 4 and 5 as all of the first transaction data TRAN_WDATA1 stored in the write buffer A22, to the second memory system A40 selected as the second slave system SLAVE2. Accordingly, the second memory system A40 stores 0, 1, 2, 3, 4 and 5 as the first transaction data TRAN_WDATA1 transferred from the master system A20, in the second nonvolatile memory device A41 included therein.

The master system A20 has checked that the start data is included in the second transaction data TRAN_WDATA2 which are transaction-completed. Therefore, when performing the flush operation for the write buffer A22, the master system A20 transfers all of the second transaction data TRAN_WDATA2 which are stored in the write buffer A22 and are transaction-completed, to the second slave system SLAVE2, and thereby, stores them in the nonvolatile memory device included in the second slave system SLAVE2. Namely, the master system A20 transfers 110, 111, 112 and 113 as all of the second transaction data TRAN_WDATA2 stored in the write buffer A22, to the second memory system A40 selected as the second slave system SLAVE2. Accordingly, the second memory system A40 stores 110, 111, 112 and 113 as the second transaction data TRAN_WDATA2 transferred from the master system A20, in the second nonvolatile memory device A41 included therein.

The second nonvolatile memory device A41 includes the plurality of memory blocks MEMORY BLOCK<0, 1, 2, . . . >.

The second memory system A40 selected as the second slave system SLAVE2 simultaneously receives the first transaction data TRAN_WDATA1 and the second transaction data TRAN_WDATA2 transferred from the master system A20.

The second memory system A40 stores 0, 1, 2, 3, 4 and 5 as the first transaction data TRAN_WDATA1, in a zeroth memory block BLOCK0 of the second nonvolatile memory device A41 included therein.

The second memory system A40 stores 110, 111, 112 and 113 as the second transaction data TRAN_WDATA2, in a first memory block BLOCK1 of the second nonvolatile memory device A41 included therein.

Referring to FIG. 3E, it may be seen that 0, 1, 2, 3 and 4 as first transaction data TRAN_WDATA1, 110, 111 and 112 as second transaction data TRAN_WDATA2 and A and B as second write data NMAL_WDATA are stored in the write buffer A22.

First, the master system A20 classifies 0, 1, 2, 3 and 4 as write data WDATA of which transaction ID information have the first value, among the write data WDATA stored in the write buffer A22, into the first transaction data TRAN_WDATA1. By checking that a preset commit information and a preset abort information are not included in 0, 1, 2, 3 and 4 as the first transaction data TRAN_WDATA1 stored in the write buffer A22, the master system A20 may be aware that it is a transaction-uncompleted state in which the commit of the first transaction is not completed.

The master system A20 classifies 110, 111 and 112 as write data WDATA of which transaction ID information have the second value, among the write data WDATA stored in the write buffer A22, into the second transaction data TRAN_WDATA2. By checking that a preset commit information and a preset abort information are not included in 110, 111 and 112 as the second transaction data TRAN_WDATA2 stored in the write buffer A22, the master system A20 may be aware that it is a transaction-uncompleted state in which the commit of the second transaction is not completed.

The master system A20 classifies A and B as write data WDATA of which transaction ID information are not set, among the write data WDATA stored in the write buffer A22, into the second write data NMAL_WDATA.

In this way, by checking transaction ID information corresponding to the respective write data WDATA stored in the write buffer A22, the master system A20 classifies the write data WDATA into the first transaction data TRAN_WDATA1, the second transaction data TRAN_WDATA2 and the second write data NMAL_WDATA.

Then, when performing a flush operation for the write buffer A22, the master system A20 transfers the first transaction data TRAN_WDATA1 which are transaction-uncompleted, to the first slave system SLAVE1, and thereby, stores the first transaction data TRAN_WDATA1 in the nonvolatile memory device included in the first slave system SLAVE1. In other words, the master system A20 transfers 0, 1, 2, 3 and 4 as the first transaction data TRAN_WDATA1, to the first memory system A30 selected as the first slave system SLAVE1. Accordingly, the first memory system A30 stores 0, 1, 2, 3 and 4 as the first transaction data TRAN_WDATA1 transferred from the master system A20, in the first nonvolatile memory device A31 included therein.

Also, when performing the flush operation for the write buffer A22, the master system A20 transfers the second transaction data TRAN_WDATA2 which are transaction-uncompleted, to the first slave system SLAVE1, and thereby, stores the second transaction data TRAN_WDATA2 in the nonvolatile memory device included in the first slave system SLAVE1. In other words, the master system A20 transfers 110, 111 and 112 as the second transaction data TRAN_WDATA2, to the first memory system A30 selected as the first slave system SLAVE1. Accordingly, the first memory system A30 stores 110, 111 and 112 as the second transaction data TRAN_WDATA2 transferred from the master system A20, in the first nonvolatile memory device A31 included therein.

Further, when performing the flush operation for the write buffer A22, the master system A20 stores A and B as the second write data NMAL_WDATA which are not grouped into a transaction, in the third nonvolatile memory device A21 included therein.

The first nonvolatile memory device A31 includes the plurality of memory blocks MEMORY BLOCK<0, 1, 2, . . . >.

The first memory system A30 selected as the first slave system SLAVE1 simultaneously receives the first transaction data TRAN_WDATA1 and the second transaction data TRAN_WDATA2 transferred from the master system A20.

The first memory system A30 stores 0, 1, 2, 3 and 4 as the first transaction data TRAN_WDATA1, in a zeroth memory block BLOCK0 of the first nonvolatile memory device A31 included therein.

The first memory system A30 stores 110, 111 and 112 as the second transaction data TRAN_WDATA2, in a first memory block BLOCK1 of the first nonvolatile memory device A31 included therein.

FIG. 4 is a flow chart of the operation of the data processing system including a plurality of memory systems in accordance with the first embodiment of the present disclosure.

Referring to FIG. 4, the master system A20 receives write data WDATA in the write buffer A22 from the host A10 (S10).

The master system A20 checks whether the write data WDATA received in the write buffer A22 at the step S10 are data grouped into a transaction (S20).

In the case where, as a result of the step S20, the write data WDATA are not grouped into a transaction (NO), the write data WDATA are stored in the nonvolatile memory device included in the master system A20 (S40).

In the case where, as a result of the step S20, the write data WDATA are grouped into a transaction (YES), then whether the transaction is committed is checked (S30).

In the case where, as a result of the step S30, the transaction of the write data WDATA is not committed (NO), the write data WDATA are stored in the nonvolatile memory device included in the first slave system SLAVE1 (S50).

In the case where, as a result of the step S30, the transaction of the write data WDATA is committed (YES), then whether start data of the committed transaction is included in the write buffer A22 is checked (S60).

In the case where, as a result of the step S60, the start data of the committed transaction is included in the write buffer A22 (YES), the write data WDATA which are stored in the write buffer A22 and of which transaction is committed are stored in the nonvolatile memory device included in the second slave system SLAVE2 (S70).

In the case where, as a result of the step S60, the start data of the committed transaction is not included in the write buffer A22 (NO), remaining data (including the start data) of the write data WDATA of which transaction is committed are received from the nonvolatile memory device included in the first slave system SLAVE1 and are stored in the nonvolatile memory device included in the second slave system SLAVE2 (S80).

In succession to the step S80, the remaining data of the write data WDATA of which transaction is committed are invalidated in the nonvolatile memory device included in the first slave system SLAVE1 (S90).

In succession to the step S90, the write data WDATA which are stored in the write buffer A22 and of which transaction is committed are stored in the nonvolatile memory device included in the second slave system SLAVE2 (S70).

As is apparent from the above descriptions, in the technology in accordance with the first embodiment of the present disclosure, data received from a host may be stored by being appropriately distributed over a plurality of memory systems, depending on whether the received data are grouped into a transaction or not and whether transaction data are committed or not.

Through this, an algorithm for ensuring the transaction data may be simplified. Moreover, it is possible to easily distinguish the valid/invalid state of the transaction data in an SPAR (sudden power-off recovery) operation.

Second Embodiment

Figure 5:
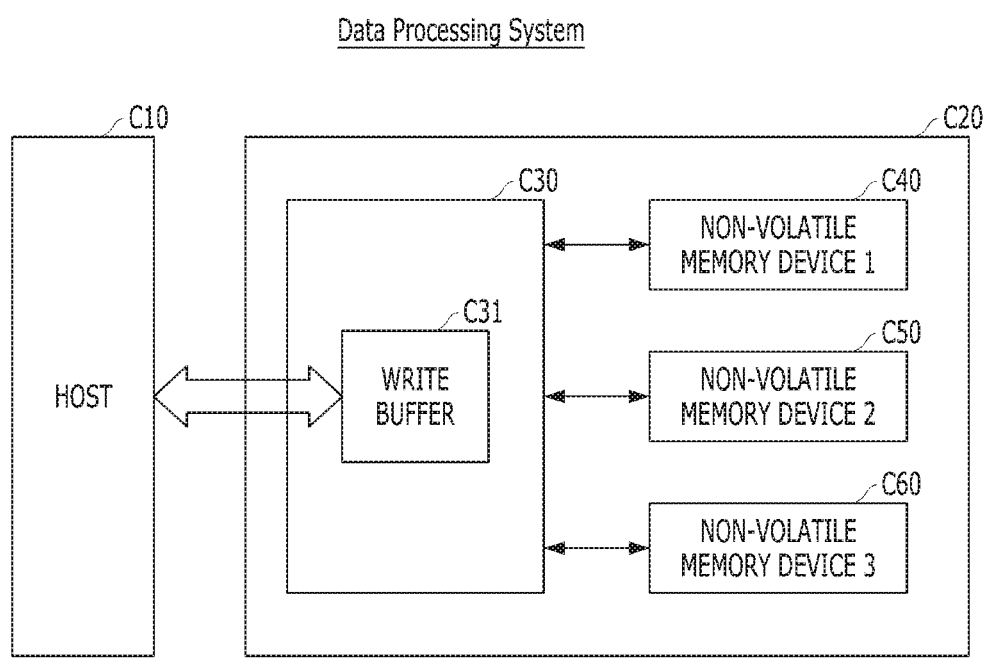
FIGS. 5 and 6 are diagrams of a data processing system including a plurality of memory systems in accordance with a second embodiment of the present disclosure.
Figure 6:
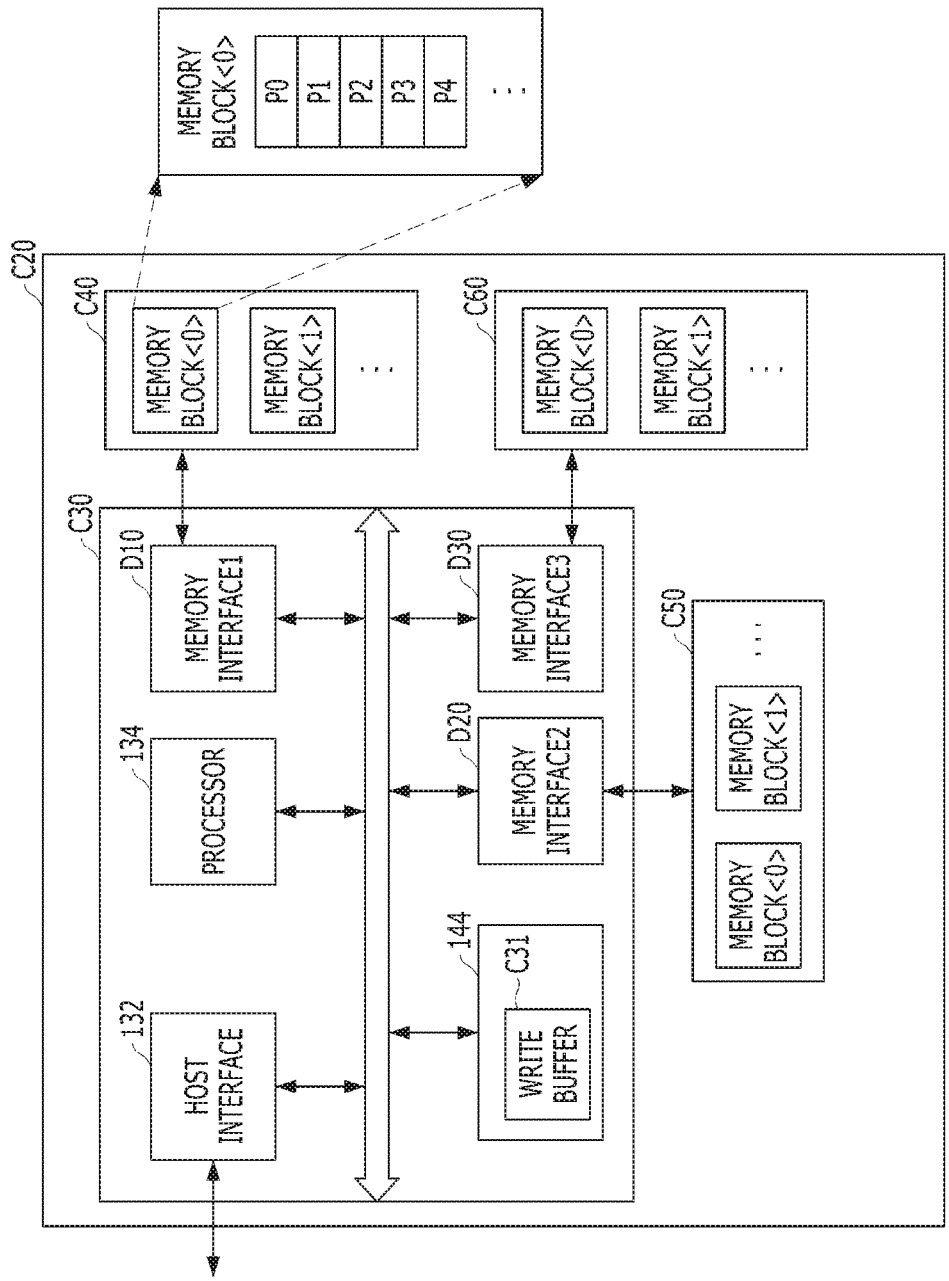

FIGS. 5 and 6 are diagrams of a data processing system including a plurality of memory systems in accordance with a second embodiment of the present disclosure.

Referring to FIG. 5, the data processing system in accordance with the second embodiment of the present disclosure includes a host C10 and a memory system C20. The memory system C20 includes a controller C30, a first nonvolatile memory device C40, a second nonvolatile memory device C50 and a third nonvolatile memory device C60.

The host C10 transmits a plurality of commands corresponding to a user request to the memory system C20, and accordingly, the memory system C20 performs operations corresponding to the commands, that is, operations corresponding to the user request.

The memory system C20 operates in response to a request of the host C10, in particular, stores data to be accessed by the host C10. In other words, the memory system C20 may be used as a main memory device or an auxiliary memory device of the host C10. The memory system C20 may be realized as any one of various types of storage devices, depending on a host interface protocol which is coupled with the host C10. For example, the memory system C20 may be realized as any one of various kinds of storage devices such as a solid state driver (SSD), a multimedia card in the form of an MMC, an eMMC (embedded MMC), an RS-MMC (reduced size MMC) and a micro-MMC, a secure digital card in the form of an SD, a mini-SD and a micro-SD, a universal serial bus (USB) storage device, a universal flash storage (UFS) device, a compact flash (CF) card, a smart media card, a memory stick, and so forth.

Also, the memory system C20 may be integrated into one semiconductor device and configure a memory card. For instance, the memory system C20 may configure a memory card such as a Personal Computer Memory Card International Association (PCMCIA) card, a compact flash (CF) card, a smart media card in the form of an SM and an SMC, a memory stick, a multimedia card in the form of an MMC, an RS-MMC and a micro-MMC, a secure digital card in the form of an SD, a mini-SD, a micro-SD and an SDHC, and a universal flash storage (UFS) device.

For another instance, the memory system C20 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID (radio frequency identification) device, or one of various component elements configuring a computing system.

The memory system C20 may include a storage device such as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), a resistive RAM (RRAM) and a flash memory.

The controller C30 includes a write buffer CM for temporarily storing a plurality of write data WDATA inputted from the host C10.

The controller C30 may classify any one among the first nonvolatile memory device C40, the second nonvolatile memory device C50 and the third nonvolatile memory device C60 as a main device and any one of the remaining two as a first auxiliary device and the other as a second auxiliary device, depending on a predetermined reference.

In detail, in the case where all of the first nonvolatile memory device C40, the second nonvolatile memory device C50 and the third nonvolatile memory device C60 are capable or incapable of being overwritten, the controller C30 performs a first comparison operation of comparing the total size of the first nonvolatile memory device C40, the total size of the second nonvolatile memory device C50 and the total size of the third nonvolatile memory device C60.

As a result of such a first comparison operation, a memory device having a largest size is classified as the main device, a memory device having a smallest size is classified as the first auxiliary device, and a memory device having a middle size is classified as the second auxiliary device.

For example, in the case where the total size of the third nonvolatile memory device C60 is largest and the total size of the first nonvolatile memory device C40 is smaller than the total size of the second nonvolatile memory device C50, the third nonvolatile memory device C60 is classified as the main device, the first nonvolatile memory device C40 is classified as the first auxiliary device, and the second nonvolatile memory device C50 is classified as the second auxiliary device.

In the case where, as a result of the first comparison operation, the total size of the first nonvolatile memory device C40, the total size of the second nonvolatile memory device C50 and the total size of the third nonvolatile memory device C60 are all the same, the controller C30 performs a second comparison operation of comparing the size of an empty space in the total size of the first nonvolatile memory device C40, the size of an empty space in the total size of the second nonvolatile memory device C50 and the size of an empty space in the total size of the third nonvolatile memory device C60.

As a result of such a second comparison operation, a memory device having a largest empty space size is classified as the main device, a memory device having a smallest empty space size is classified as the first auxiliary device, and a memory device having a middle empty space size is classified as the second auxiliary device.

For example, in the case where the size of the empty space of the first nonvolatile memory device C40 is largest and the size of the empty space of the second nonvolatile memory device C50 is larger than the size of the empty space of the third nonvolatile memory device C60, the first nonvolatile memory device C40 is classified as the main device, the third nonvolatile memory device C60 is classified as the first auxiliary device, and the second nonvolatile memory device C50 is classified as the second auxiliary device.

In the case where any one memory device among the first nonvolatile memory device C40, the second nonvolatile memory device C50 and the third nonvolatile memory device C60 is capable of being overwritten and the remaining two memory devices are incapable of being overwritten, the controller C30 classifies the any one memory device which is capable of being overwritten, as the first auxiliary device, classifies any one memory device of the remaining two memory devices being incapable of being overwritten which has a larger total size, as the main device, and classifies the other memory device which has a smaller total size, as the second auxiliary device. In this regard, in the case where the total sizes of the remaining two memory devices which are incapable of being overwritten are the same with each other, any one of the remaining two memory devices which has a larger empty space size is classified as the main device, and the other which has a smaller empty space size is classified as the second auxiliary device.

For example, in the case where the first nonvolatile memory device C40 is a memory device which is capable of being overwritten, the second nonvolatile memory device C50 and the third nonvolatile memory device C60 are memory devices which are incapable of being overwritten and the total size of the third nonvolatile memory device C60 is larger than the total size of the second nonvolatile memory device C50, the first nonvolatile memory device C40 is classified as the first auxiliary device, the third nonvolatile memory device C60 which has a larger total size between the second nonvolatile memory device C50 and the third nonvolatile memory device C60 is classified as the main device, and the second nonvolatile memory device C50 which has a smaller total size is classified as the second auxiliary device.

For another example, in the case where the first nonvolatile memory device C40 is a memory device which is capable of being overwritten, the second nonvolatile memory device C50 and the third nonvolatile memory device C60 are memory devices which are incapable of being overwritten, the total size of the third nonvolatile memory device C60 and the total size of the second nonvolatile memory device C50 are the same with each other and the size of the empty space of the second nonvolatile memory device C50 is larger than the size of the empty space of the third nonvolatile memory device C60, the first nonvolatile memory device C40 is classified as the first auxiliary device, the third nonvolatile memory device C60 which has a smaller empty space size between the second nonvolatile memory device C50 and the third nonvolatile memory device C60 is classified as the second auxiliary device, and the second nonvolatile memory device C50 which has a larger empty space size is classified as the main device.

In the case where any one memory device among the first nonvolatile memory device C40, the second nonvolatile memory device C50 and the third nonvolatile memory device C60 is incapable of being overwritten and the remaining two memory devices are capable of being overwritten, the controller C30 classifies the any one memory device which is incapable of being overwritten, as the main device, classifies any one memory device of the remaining two memory devices being capable of being overwritten which has a smaller total size, as the first auxiliary device, and classifies the other memory device which has a larger total size, as the second auxiliary device. In this regard, in the case where the total sizes of the remaining two memory devices which are capable of being overwritten are the same with each other, any one of the remaining two memory devices which has a smaller empty space size is classified as the first auxiliary device, and the other which has a larger empty space size is classified as the second auxiliary device.

For example, in the case where the first nonvolatile memory device C40 is a memory device which is incapable of being overwritten, the second nonvolatile memory device C50 and the third nonvolatile memory device C60 are memory devices which are capable of being overwritten and the total size of the third nonvolatile memory device C60 is larger than the total size of the second nonvolatile memory device C50, the first nonvolatile memory device C40 is classified as the main device, the third nonvolatile memory device C60 which has a larger total size between the second nonvolatile memory device C50 and the third nonvolatile memory device C60 is classified as the second auxiliary device, and the second nonvolatile memory device C50 which has a smaller total size is classified as the first auxiliary device.

For another example, in the case where the first nonvolatile memory device C40 is a memory device which is incapable of being overwritten, the second nonvolatile memory device C50 and the third nonvolatile memory device C60 are memory devices which are capable of being overwritten, the total size of the third nonvolatile memory device C60 and the total size of the second nonvolatile memory device C50 are the same with each other and the size of the empty space of the second nonvolatile memory device C50 is larger than the size of the empty space of the third nonvolatile memory device C60, the first nonvolatile memory device C40 is classified as the main device, the third nonvolatile memory device C60 which has a smaller empty space size between the second nonvolatile memory device C50 and the third nonvolatile memory device C60 is classified as the first auxiliary device, and the second nonvolatile memory device C50 which has a larger empty space size is classified as the second auxiliary device.

The controller C30 distributes the write data WDATA stored in the write buffer C31, in the main device, the first auxiliary device and the second auxiliary device, depending on a result of analyzing the characteristics of the write data WDATA.

In detail, the controller C30 classifies the write data WDATA stored in the write buffer C31 into first write data TRAN_WDATA which are grouped into a transaction and second write data NMAL_WDATA which are not grouped into a transaction.

When performing a flush operation for the write buffer C31, the controller C30 stores the second write data NMAL_WDATA which are not grouped into a transaction, in the main device.

Also, the controller C30 distributes the first write data TRAN_WDATA, in the first auxiliary device and the second auxiliary device.

The fact that write data WDATA are grouped into a transaction means that a plurality of write data WDATA used for the same use among write data WDATA are grouped into one transaction.

For example, in a database, data used for the correction, addition and update of already stored data may be grouped into respective transactions according to the respective uses. In this regard, data for correcting a database may be set to be grouped into one transaction group, and data for adding a database may be set to be grouped into another transaction group.

Therefore, when write data TRAN_WDATA which are grouped into one transaction are transmitted from the host C10 to the controller C30, there exists only a commit state in which all of the write data TRAN_WDATA are normally transmitted and stored and are thus valid, or an abort state in which any one of the write data TRAN_WDATA is not normally transmitted and stored, or all of the write data TRAN_WDATA become invalid according to an abort request of the host C10. That is, write data TRAN_WDATA which are grouped into one transaction are meaningful only when they are in a commit state as all of the write data are normally transmitted and stored, and are thus all valid.

For example, the first write data TRAN_WDATA grouped into a transaction may be determined as a commit state when all pieces of first write data TRAN_WDATA are normally transmitted from the host C10 to the controller C30 and completely stored in the controller C30 and there is no abort request from the host C10. If any piece of first write data TRAN_WDATA is not normally transmitted and stored, or an abort request is received from the host C10, all of the first write data TRAN_WDATA are determined as an abort state.

For reference, the operation of managing the first write data TRAN_WDATA grouped into a transaction, by classifying the first write data TRAN_WDATA into a commit state or an abort state as described above, may be generally referred to as an operation for ensuring the transaction.

The controller C30 classifies first write data TRAN_WDATA which are incompletely committed among the first write data TRAN_WDATA stored in the write buffer C31, as third write data, and classifies first write data TRAN_WDATA which are completely committed, as fourth write data.

In this state, the controller C30 stores the third write data in the first auxiliary device. Also, the controller C30 stores the fourth write data in the second auxiliary device.

For example, in the case where the first nonvolatile memory device C40 is classified as the first auxiliary device, the second nonvolatile memory device C50 is classified as the second auxiliary device and the third nonvolatile memory device C60 is classified as the main device, the controller C30 stores the second write data NMAL_WDATA in the third nonvolatile memory device C60, stores the third write data in the first nonvolatile memory device C40, and stores the fourth write data in the second nonvolatile memory device C50.

For another example, in the case where the first nonvolatile memory device C40 is classified as the second auxiliary device, the second nonvolatile memory device C50 is classified as the first auxiliary device and the third nonvolatile memory device C60 is classified as the main device, the controller C30 stores the second write data NMAL_WDATA in the third nonvolatile memory device C60, stores the third write data in the second nonvolatile memory device C50, and stores the fourth write data in the first nonvolatile memory device C40.

When classifying the first write data TRAN_WDATA stored in the write buffer C31 as the fourth write data, the controller C30 checks whether start data of the fourth write data corresponding to the transaction is included in the fourth write data stored in the write buffer C31.

For example, a state in which first write data TRAN_WDATA grouped into a first transaction and a second transaction are stored in the write buffer C31 may be assumed. In this state, at a time when the first transaction is committed, that is, at a time when the first write data TRAN_WDATA of the first transaction are classified as the fourth write data of the first transaction, the controller C30 checks whether the start data of the first transaction is stored in the write buffer C31. Similarly, at a time when the second transaction is committed, that is, at a time when the first write data TRAN_WDATA of the second transaction are classified as the fourth write data of the second transaction, the controller C30 checks whether the start data of the second transaction is stored in the write buffer C31.

As a result of checking whether start data is stored, in the case where the start data of the first transaction is stored in the write buffer C31 at the time when the first transaction is committed, it may be seen that it is a state in which all of the first write data TRAN_WDATA grouped into the first transaction are stored in the write buffer C31 as the fourth write data.

The fact that the first transaction is committed means that all of the first write data TRAN_WDATA grouped into the first transaction have been transmitted to the controller C30. Namely, the fact that the first transaction is committed means that all (i.e., from the start data to last data) of the first write data TRAN_WDATA grouped into the first transaction have been transmitted to the controller C30.

Therefore, from the fact that the fourth write data grouped into the first transaction are stored in the write buffer C31 in a state in which the fourth write data include the start data of the first transaction, it may be seen that the fourth write data stored in the write buffer C31 are all of the data for the first transaction.

In this way, in the case where it is checked that the start data of the first transaction is included in the fourth write data stored in the write buffer C31, the controller C30 stores all of the fourth write data stored in the write buffer C31, in the second auxiliary device, when a flush operation is performed for the write buffer C31.

As a result of checking whether start data is stored, in the case where the start data of the second transaction is not stored in the write buffer C31 when the second transaction is committed, it may be seen that it is not a state in which all of the first write data TRAN_WDATA grouped into the second transaction are stored in the write buffer C31 as the fourth write data.

Some data including the start data of the second transaction may be stored in the first auxiliary device.

This is because, as described above for the controller C30, in the case where first write data TRAN_WDATA which are incompletely committed are stored in the write buffer C31 when performing a flush operation for the write buffer C31, the first write data TRAN_WDATA which are incompletely committed, are written in the first auxiliary device.

In this way, in the case where the start data of the second transaction is not stored in the write buffer C31 when the second transaction is committed, it is meant that a flush operation has been previously performed for the write buffer C31 before the second transaction is committed after being started and accordingly first write data TRAN_WDATA grouped into the second transaction starts to be transmitted into the write buffer C31 and thus a part (including the start data) of the data group for the second transaction has been written in the first auxiliary device due to the previous flush operation.

Therefore in the case where the start data of the second transaction is not stored in the write buffer C31 at the time when the second transaction is committed, the controller C30 reads remaining data (including the start data of the data group) of the second transaction, which are not stored in the write buffer C31, from the first auxiliary device, and writes the remaining data in the second auxiliary device. In succession, the controller C30 invalidates the remaining data of the second transaction in the first auxiliary device. Then, the controller C30 stores the fourth write data of the second transaction which are stored in the write buffer C31, in the second auxiliary device.

In a recovery operation period that is entered after a sudden power-off (SPO) occurs, the controller C30 invalidates all data stored in the first auxiliary device.

The reason for this is that, in the case where an SPO occurs, first write data TRAN_WDATA which are incompletely committed may be lost while being stored in the write buffer C31 as a volatile memory device and due to this fact, a transaction of first write data TRAN_WDATA which are incompletely committed and are not lost when the SPO occurs because they are stored in the first auxiliary device may not be ensured.

Therefore, in the case where an SPO occurs, in order to invalidate all first write data TRAN_WDATA which are incompletely committed, the controller C30 invalidates all of the data stored in the first auxiliary device. In this way, after all of the data stored in the first auxiliary device are invalidated, the controller C30 transfers information on a transaction corresponding to the data invalidation, to the host C10.

When write data WDATA are inputted from the host C10, write commands (not shown) respectively corresponding to the write data WDATA are inputted together, and transaction information (not shown) of the respective write data WDATA are included in the write commands, respectively.

The transaction information of each of the write data WDATA may include a transaction identification (ID) information, a transaction commit information, a transaction abort information and a transaction start information.

The controller C30 stores the write data WDATA in the write buffer C31 in response to the respective write commands.

The controller C30 checks transaction ID information in the transaction information of the respective write data WDATA which are included in the write commands, and thereby, classifies the write data WDATA stored in the write buffer C31 into first write data TRAN_WDATA or second write data NMAL_WDATA which are not grouped into a transaction.

In detail, the controller C30 checks transaction ID information in the transaction information of the respective write data WDATA stored in the write buffer C31, and thereby, classifies write data WDATA of which transaction ID information are set to a specified value, into first write data TRAN_WDATA.

On the other hand, the controller C30 checks transaction ID information in the transaction information of the respective write data WDATA stored in the write buffer C31, and thereby, classifies write data WDATA of which transaction ID information are not set, into second write data NMAL_WDATA.

For example, the controller C30 may classify write data WDATA of which transaction ID information have a first value, among the write data WDATA stored in the write buffer C31, into first write data TRAN_WDATA which are grouped into a first transaction.

Also, the controller C30 may classify write data WDATA of which transaction ID information have a second value, among the write data WDATA stored in the write buffer C31, into first write data TRAN_WDATA which are grouped into a second transaction.

On the other hand, the controller C30 may classify write data WDATA of which transaction ID information are not set to any value, among the write data WDATA stored in the write buffer C31, into second write data NMAL_WDATA which are not grouped into a transaction.

For reference, the fact that transaction ID information are not set to any value may mean the case where transaction ID information are set to a predefined initial value or a value that is meaningless as a transaction ID information.

The controller C30 may check whether a commit is completed, by checking whether a preset commit information is included in the transaction information of the respective first write data TRAN_WDATA stored in the write buffer C31.

Similarly, the controller C30 may check whether an abort is completed, by checking whether a preset abort information is included in the transaction information of the respective first write data TRAN_WDATA stored in the write buffer C31.

The controller C30 may check whether transaction start data is stored in the write buffer C31, by checking whether a preset start information is included in the transaction information of the respective first write data TRAN_WDATA stored in the write buffer C31.

For example, in the case where a preset commit information is included in the transaction information of respective first write data TRAN_WDATA which are stored in the write buffer C31 and are grouped into the first transaction, the first write data TRAN_WDATA which are grouped into the first transaction may be regarded as being completely committed.

In this regard, in the case where a preset start information is included in the transaction information of the respective first write data TRAN_WDATA which are stored in the write buffer C31 and are grouped into the first transaction, it may be seen that the first write data TRAN_WDATA which are grouped into the first transaction are completely committed and the start data of the first transaction is stored in the write buffer C31. Therefore, when performing a flush operation for the write buffer C31, the controller C30 stores all of the first write data TRAN_WDATA which are stored in the write buffer C31 and are grouped into the first transaction, in the second auxiliary device.

Conversely, in the case where a preset start information is not included in the transaction information of the first write data TRAN_WDATA which are stored in the write buffer C31 and are grouped into the first transaction, it may be seen that the first write data TRAN_WDATA which are grouped into the first transaction are completely committed and the start data of the first transaction is not stored in the write buffer C31. Therefore, when performing a flush operation for the write buffer C31, the controller C30 receives remaining data (including the start data) of first write data TRAN_WDATA which are grouped into the first transaction, transferred from the first auxiliary device, stores the received data in the second auxiliary device, and then stores all of the first write data TRAN_WDATA which are stored in the write buffer C31 and are grouped into the first transaction, in the second auxiliary device.

In the case where a preset commit information and a preset abort information are not included in the transaction information of respective first write data TRAN_WDATA which are stored in the write buffer C31 and are grouped into the second transaction, it may be regarded that the first write data TRAN_WDATA which are grouped into the second transaction are incompletely committed and are not aborted. That is, it may be regarded that not all first write data TRAN_WDATA which are grouped into the second transaction are transmitted from the host C10.

In the case where a preset start information is included in the transaction information of the first write data TRAN_WDATA which are stored in the write buffer C31 and are grouped into the second transaction, it may be seen that the first write data TRAN_WDATA which are grouped into the second transaction are incompletely committed and the start data of the second transaction is stored in the write buffer C31. Therefore, when performing the flush operation for the write buffer C31, the controller C30 stores the first write data TRAN_WDATA which are grouped into the second transaction, in the first auxiliary device.

Conversely, in the case where a preset start information is not included in the transaction information of the first write data TRAN_WDATA which are stored in the write buffer C31 and are grouped into the second transaction, it may be seen that the first write data TRAN_WDATA which are grouped into the second transaction are incompletely committed and the start data of the second transaction is not stored in the write buffer C31. Therefore, when performing the flush operation for the write buffer C31, the controller C30 stores the first write data TRAN_WDATA which are grouped into the second transaction, in the first auxiliary device.

In the case where a preset abort information is included in the transaction information of respective first write data TRAN_WDATA which are stored in the write buffer C31 and are grouped into a third transaction, when performing the flush operation for the write buffer C31, the controller C30 discards the first write data TRAN_WDATA which are stored in the write buffer C31 and are grouped into the third transaction.

For reference, each of the first write data TRAN_WDATA which are grouped into the first transaction may be in a state in which the transaction ID information of the transaction information thereof has a first value. Further, each of the first write data TRAN_WDATA which are grouped into the second transaction may be in a state in which the transaction ID information of the transaction information thereof has a second value. Moreover, each of the first write data TRAN_WDATA which are grouped into the third transaction may be in a state in which the transaction ID information of the transaction information thereof has a third value.

In this way, respective first write data TRAN_WDATA which are stored in the write buffer C31 are determined as different transaction groups depending on the transaction ID information of transaction information which are specified to as values.

That is, a plurality of transaction groups may be mixed in the first write data TRAN_WDATA which are stored in the write buffer C31, a certain transaction group among the plurality of transaction groups may be a commit-completed state, a certain transaction group may be a commit-uncompleted state, and a certain transaction group may be an aborted state.

Referring to FIG. 6, among the components of the data processing system described above with reference to FIG. 5, the detailed configuration of the memory system C20 is shown.

First, the controller C30 included in the memory system C20 controls the first to third nonvolatile memory devices C40, C50 and C60 in response to a request from the host C10. For example, the controller C30 provides data read from the first to third nonvolatile memory devices C40, C50 and C60, to the host C10, and stores data provided from the host C10, in the first to third nonvolatile memory devices C40, C50 and C60. To this end, the controller C30 controls the operations of the first to third nonvolatile memory devices C40, C50 and C60, such as read, write, program and erase operations.

In detail, the controller C30 included in the memory system C20 includes a host interface unit (HOST INTERFACE) 132, a processor (PROCESSOR) 134, a memory 144, a first memory interface unit (MEMORY INTERFACE1) D10, a second memory interface unit (MEMORY INTERFACE2) D20 and a third memory interface unit (MEMORY INTERFACE3) D30.

The host interface unit 132 performs an operation of exchanging commands and data to be transferred between the memory system C20 and the host C10, and may be configured to communicate with the host C10 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and MIPI (mobile industry processor interface). The host interface unit 32 may be driven through a firmware which is referred to as a host interface layer (HIL), as a region which exchanges data with the host C10.

The first to third memory interface units D10, D20 and D30 serve as memory/storage interfaces which perform interfacing between the controller C30 and the first to third nonvolatile memory devices C40, C50 and C60, to allow the controller C30 to control the respective first to third nonvolatile memory devices C40, C50 and C60 in response to a request from the host C1.0. Each of the first to third memory interface units D10, D20 and D30 generates control signals for each of the first to third nonvolatile memory devices C40, C50 and C60 and processes data under the control of the processor 134, as a NAND flash controller (NFC) in the case where each of the first to third nonvolatile memory devices C40, C50 and C60 is a flash memory, in particular, in the case where each of the first to third nonvolatile memory devices C40, C50 and C60 is a NAND flash memory.

Each of the first to third memory interface units D10, D20 and D30 may support the operation of an interface which processes a command and data between the controller C30 and each of the first to third nonvolatile memory devices C40, C50 and C60, for example, a NAND flash interface, in particular, data input/output between the controller C30 and each of the first to third nonvolatile memory devices C40, C50 and C60, and may be driven through a firmware which is referred to as a flash interface layer (FIL), as a region which exchanges data with each of the first to third nonvolatile memory devices C40, C50 and C60.

The memory 144 as the working memory of the memory system C20 and the controller C30 stores data for driving of the memory system C20 and the controller C30. In detail, the memory 144 temporarily stores data which should be managed, when the controller C30 controls the first to third nonvolatile memory devices C40, C50 and C60 in response to a request from the host C10, for example, when the controller C30 controls the operations of the first to third nonvolatile memory devices C40, C50 and C60, such as read, write, program and erase operations.

The memory 144 may be realized by a volatile memory. For example, the memory 144 may be realized by a static random access memory (SRAM) or a dynamic random access memory (DRAM).

The memory 144 may be disposed inside the controller C30 as illustrated in FIG. 6, and may be disposed outside the controller C30 unlike the illustration of FIG. 6. In the case where the memory 144 is disposed outside the controller C30 unlike the illustration of FIG. 6, the memory 144 should be realized by an external volatile memory to and from which data are inputted and outputted from and to the controller C30 through a separate memory interface (not shown).

The memory 144 stores data which should be managed in the course of controlling the operations of the first to third nonvolatile memory devices C40, C50 and C60. For such data storage, the memory 144 may include a program memory, a data memory, a write buffer/cache, a read buffer/cache, a data buffer/cache, a map buffer/cache, and so forth. Thus, the write buffer C31 for temporarily storing the plurality of write data WDATA inputted from the host C10 as described above may be included in the memory 144 as shown in FIG. 6.

The processor 134 controls the entire operations of the controller C30, and in particular, controls a program operation or a read operation for the first to third nonvolatile memory devices C40, C50 and C60, in response to a write request or a read request from the host C1.0. The processor 134 drives a firmware which is referred to as a flash translation layer (FTL), to control general operations of the controller C30 for the first to third nonvolatile memory devices C40, C50 and C60. The processor 134 may be realized by a microprocessor or a central processing unit (CPU).

For instance, the controller C30 performs an operation requested from the host C10, in the first to third nonvolatile memory devices C40, C50 and C60, that is, performs a command operation corresponding to a command received from the host C10, with the first to third nonvolatile memory devices C40, C50 and C60, through the processor 134 which is realized by a microprocessor or a central processing unit (CPU). The controller C30 may perform a foreground operation as a command operation corresponding to a command received from the host C10, for example, a program operation corresponding to a write command, a read operation corresponding to a read command, an erase operation corresponding to an erase command or a parameter set operation corresponding to a set parameter command or a set feature command as a set command.

The controller C30 may perform a background operation for the first to third nonvolatile memory devices C40, C50 and C60, through the processor 134 which is realized by a microprocessor or a central processing unit (CPU). The background operation for the first to third nonvolatile memory devices C40, C50 and C60 may include an operation of copying data stored in a certain memory block among memory blocks MEMORY BLOCK<0, 1, 2, . . . > of each of the first to third nonvolatile memory devices C40, C50 and C60, to another certain memory block, for example, a garbage collection (GC) operation. The background operation for the first to third nonvolatile memory devices C40, C50 and C60 may include an operation of swapping stored data among the memory blocks MEMORY BLOCK<0, 1, 2, . . . > of each of the first to third nonvolatile memory devices C40, C50 and C60, for example, a wear leveling (WL) operation. The background operation for the first to third nonvolatile memory devices C40, C50 and C60 may include an operation of storing map data stored in the controller C30, in the memory blocks MEMORY BLOCK<0, 1, 2, . . . > of each of the first to third nonvolatile memory devices C40, C50 and C60, for example, a map flush operation. The background operation for the first to third nonvolatile memory devices C40, C50 and C60 may include a bad management operation for the first to third nonvolatile memory devices C40, C50 and C60, for example, a bad block management operation of checking and processing a bad block among the plurality of memory blocks MEMORY BLOCK<0, 1, 2, . . . > included in each of the first to third nonvolatile memory devices C40, C50 and C60.

The controller C30 may generate and manage log data corresponding to an operation of accessing the memory blocks MEMORY BLOCK<0, 1, 2, . . . > of each of the first to third nonvolatile memory devices C40, C50 and C60, through the processor 134 which is realized by a microprocessor or a central processing unit (CPU). The operation of accessing the memory blocks MEMORY BLOCK<0, 1, 2, . . . > of each of the first to third nonvolatile memory devices C40, C50 and C60 includes performing of a foreground operation or a background operation for the memory blocks MEMORY BLOCK<0, 1, 2, . . . > of each of the first to third nonvolatile memory devices C40, C50 and C60.

In the processor 134 of the controller C30, a unit (not shown) for performing bad management of the first to third nonvolatile memory devices C40, C50 and C60 may be included. The unit for performing bad management of the first to third nonvolatile memory devices C40, C50 and C60 performs a bad block management of checking a bad block among the plurality of memory blocks MEMORY BLOCK<0, 1, 2, . . . > included in each of the first to third nonvolatile memory devices C40, C50 and C60 and processing the checked bad block as bad. The bad block management means that, in the case where each of the first to third nonvolatile memory devices C40, C50 and C60 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The controller C30 performs an operation of transmitting a command and data to be inputted/outputted between the controller C30 and the first to third nonvolatile memory devices C40, C50 and C60, through the processor 134 which is realized by a microprocessor or a central processing unit (CPU). The command and data to be inputted/outputted between the controller C30 and the first to third nonvolatile memory devices C40, C50 and C60 may be transmitted from the host C10 to the controller C30 or may be generated inside the controller C30.

Each of the first to third nonvolatile memory devices C40, C50 and C60 may retain stored data even though power is not supplied. In particular, each of the first to third nonvolatile memory devices C40, C50 and C60 may store write data WDATA provided from the host C10, through a write operation, and may provide read data (not shown) stored therein, to the host C10, through a read operation.

While each of the first to third nonvolatile memory devices C40, C50 and C60 may be realized by a nonvolatile memory such as a flash memory, for example, a NAND flash memory, it is to be noted that each of the first to third nonvolatile memory devices C40, C50 and C60 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

Each of the first to third nonvolatile memory devices C40, C50 and C60 includes the plurality of memory blocks MEMORY BLOCK<0, 1, 2, . . . >, In other words, each of the first to third nonvolatile memory devices C40, C50 and C60 may store write data WDATA provided from the host C10, in the memory blocks MEMORY BLOCK<0, 1, 2, . . . >, through a write operation, and may provide read data (not shown) stored in the memory blocks MEMORY BLOCK<0, 1, 2, . . . >, to the host C10, through a read operation.

Each of the memory blocks MEMORY BLOCK<0, 1, 2, . . . > included in each of the first to third nonvolatile memory devices C40, C50 and C60 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK<0, 1, 2, . . . > included in each of the first to third nonvolatile memory devices C40, C50 and C60 may be classified as a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

FIGS. 7A to 7E are diagrams of the operation of the data processing system including a plurality of memory systems in accordance with the second embodiment of the present disclosure.

FIGS. 7A to 7E are diagrams which illustrate the characterizing operation of the present disclosure by referring to the configuration of the data processing system including a plurality of memory systems in accordance with the second embodiment of the present disclosure described above with reference to FIGS. 5 and 6.

First, in FIGS. 7A to 7E described below, descriptions will be made hereunder by defining first write data TRAN_WDATA of which transaction ID information have a first value, that is, first write data TRAN_WDATA which are grouped into a first transaction, as first transaction data TRAN_WDATA1. Also, descriptions will be made hereunder by defining first write data TRAN_WDATA of which transaction ID information have a second value, that is, first write data TRAN_WDATA which are grouped into a second transaction, as second transaction data TRAN_WDATA2. Further, descriptions will be made hereunder by defining first write data TRAN_WDATA of which transaction ID information have a third value, that is, first write data TRAN_WDATA which are grouped into a third transaction, as third transaction data TRAN_WDATA3. Referring to FIGS. 7A to 7E, it may be seen that spaces in which total 10 write data WDATA may be stored exist in the write buffer C31.

In addition, in FIGS. 7A to 7E to be described below, the controller C30 classifies the first nonvolatile memory device C40 as the second auxiliary device, classifies the second nonvolatile memory device C50 as the first auxiliary device, and classifies the third nonvolatile memory device C60 as the main device.

Figure 7A:
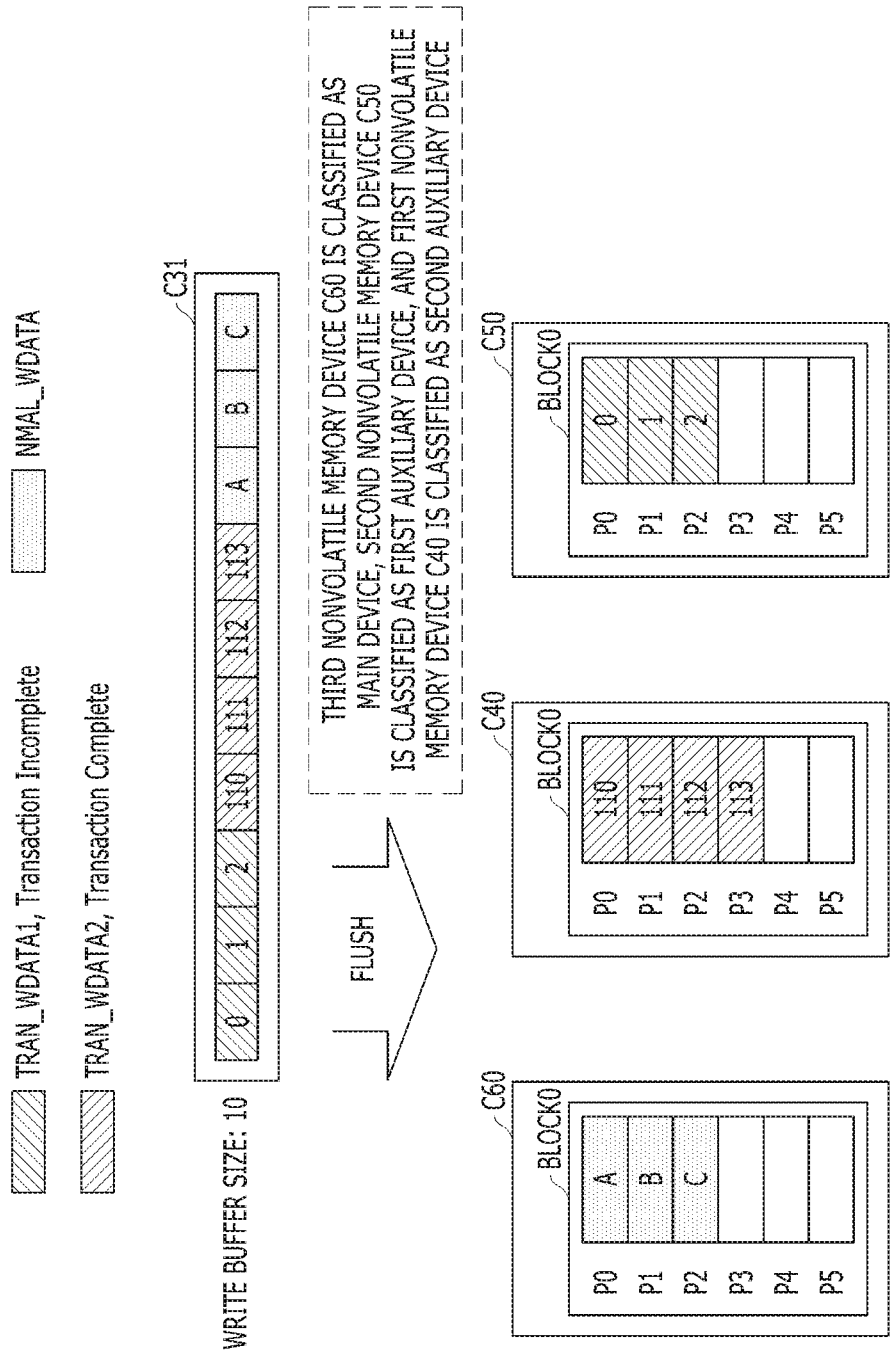

Referring to FIG. 7A, it may be seen that 0, 1 and 2 as the first transaction data TRAN_WDATA1, 110, 111, 112 and 113 as the second transaction data TRAN_WDATA2 and A, B and C as the second write data NMAL_WDATA are stored in the write buffer C31.

First, the controller C30 classifies 0, 1 and 2 as write data WDATA of which transaction ID information have the first value, among the write data WDATA stored in the write buffer C31, into the first transaction data TRAN_WDATA1. By checking that a preset commit information and a preset abort information are not included in 0, 1 and 2 as the first transaction data TRAN_WDATA1 stored in the write buffer C31, the controller C30 may be aware of that it is a transaction-uncompleted state in which the commit of the first transaction is not completed.

The controller C30 classifies 110, 111, 112 and 113 as write data WDATA of which transaction ID information have the second value, among the write data WDATA stored in the write buffer C31, into the second transaction data TRAN_WDATA2. By checking that a preset commit information is included in 110, 111, 112 and 113 as the second transaction data TRAN_WDATA2, the controller C30 may be aware that it is a transaction-completed state in which the commit of the second transaction is completed.

The controller C30 checks whether start data is included in the entire second transaction data TRAN_WDATA2 stored in the write buffer C31, when checking that it is a state in which the commit of the second transaction data TRAN_WDATA2 is completed. It may be assumed that the start data of the second transaction data TRAN_WDATA2 is 110. That is, the controller C30 may check that 110 as the start data is included in 110, 111, 112 and 113 as the second transaction data TRAN_WDATA2 which are stored in the write buffer C31.

The controller C30 classifies A, B and C as write data WDATA of which transaction ID information are not set, among the write data WDATA stored in the write buffer C31, into second write data NMAL_WDATA.

In this way, by checking transaction ID information corresponding to the respective write data WDATA stored in the write buffer C31, the controller C30 classifies the write data WDATA into the first transaction data TRAN_WDATA1, the second transaction data TRAN_WDATA2 and the second write data NMAL_WDATA.

Then, when performing a flush operation for the write buffer C31, the controller C30 stores the first transaction data TRAN_WDATA1 which are transaction-uncompleted, in the first auxiliary device. In other words, the controller C30 transfers 0, 1 and 2 as the first transaction data TRAN_WDATA1 to the second nonvolatile memory device C50 which is selected as the first auxiliary device. Accordingly, the second nonvolatile memory device C50 stores therein 0, 1 and 2 as the first transaction data TRAN_WDATA1 transferred from the controller C30.

The controller C30 has checked that the start data is included in the second transaction data TRAN_WDATA2 which are transaction-completed. Therefore, when performing the flush operation for the write buffer C31, the controller C30 stores all the second transaction data TRAN_WDATA2 which are stored in the write buffer C31 and are transaction-completed, in the second auxiliary device. Namely, the controller C30 transfers 110, 111, 112 and 113 as all of the second transaction data TRAN_WDATA2 stored in the write buffer C31, to the first nonvolatile memory device C40 which is selected as the second auxiliary device. Accordingly, the first nonvolatile memory device C40 stores therein 110, 111, 112 and 113 as the second transaction data TRAN_WDATA2 transferred from the controller C30.

When performing the flush operation for the write buffer C31, the controller C30 stores all of the second write data NMAL_WDATA which are stored in the write buffer C31 and are not grouped into a transaction, in the main device. Namely, the controller C30 transfers all the second write data NMAL_WDATA which are stored in the write buffer C31, to the third nonvolatile memory device C60 which is selected as the main device. Accordingly, the third nonvolatile memory device C60 stores therein A, B and C as the second write data NMAL_WDATA transferred from the controller C30.

Figure 7B:
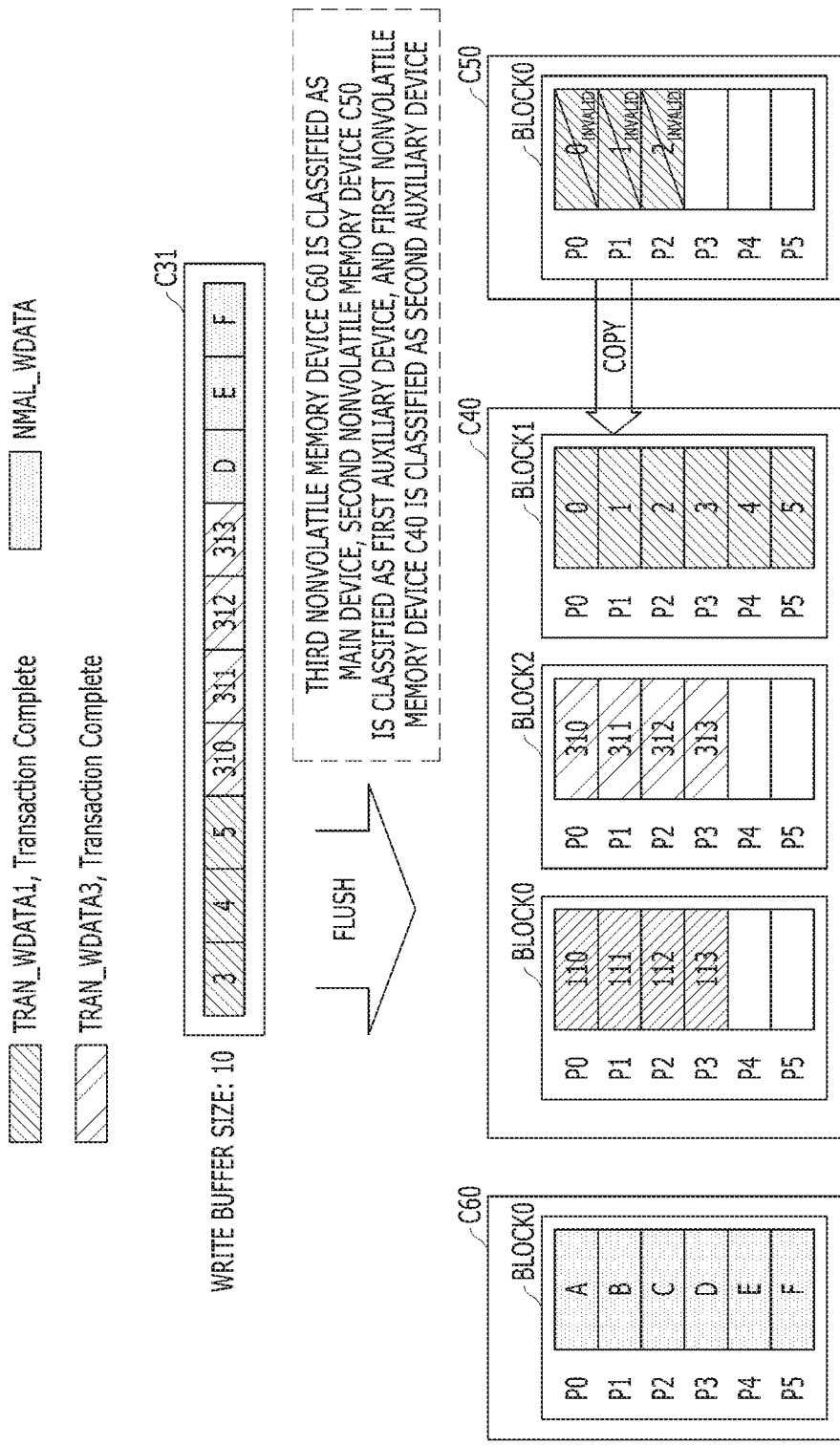

Referring to FIG. 7B, as a result of the flush operation for the write buffer C31 described above with reference to FIG. 7A, it is a state in which 0, 1 and 2 as the first transaction data TRAN_WDATA1 are stored in the second nonvolatile memory device C50 selected as the first auxiliary device. Also, as a result of the flush operation for the write buffer C31 described above with reference to FIG. 7A, it is a state in which the second transaction data TRAN_WDATA2 are stored in the first nonvolatile memory device C40 selected as the second auxiliary device. Moreover, as a result of the flush operation for the write buffer C31 described above with reference to FIG. 7A, it is a state in which the second write data NMAL_WDATA which are not grouped into a transaction are stored in the third nonvolatile memory device C60 selected as the main device.

In this state, it may be seen that 3, 4 and 5 as first transaction data TRAN_WDATA1, 310, 311, 312 and 313 as third transaction data TRAN_WDATA3 and D, E and F as second write data NMAL_WDATA are stored in the write buffer C31.

First, the controller C30 classifies 3, 4 and 5 as write data WDATA of which transaction ID information have the first value, among the write data WDATA stored in the write buffer C31, into the first transaction data TRAN_WDATA1. By checking that a preset commit information is included in 3, 4 and 5 as the first transaction data TRAN_WDATA1 stored in the write buffer C31, the controller C30 may be aware that it is a transaction-completed state in which the commit of the first transaction is completed.

The controller C30 checks whether start data is included in the entire first transaction data TRAN_WDATA1 stored in the write buffer C31, when checking that it is a state in which the commit of the first transaction data TRAN_WDATA1 is completed. It may be assumed that the start data of the first transaction data TRAN_WDATA1 is 0 described above with reference to FIG. 7A. That is, the controller C30 may check that 0 as the start data is not included in 3, 4 and 5 as the first transaction data TRAN_WDATA1 which are stored in the write buffer C31.

The controller C30 classifies 310, 311, 312 and 313 as write data WDATA of which transaction ID information have the third value, among the write data WDATA stored in the write buffer C31, into the third transaction data TRAN_WDATA3. By checking that a preset commit information is included in 310, 311, 312 and 313 as the third transaction data TRAN_WDATA3, the controller C30 may be aware that it is a transaction-completed state in which the commit of the third transaction is completed.

The controller C30 checks whether start data is included in the entire third transaction data TRAN_WDATA3 stored in the write buffer C31, when checking that it is a state in which the commit of the third transaction data TRAN_WDATA3 is completed. It may be assumed that the start data of the third transaction data TRAN_WDATA3 is 310. That is, the controller C30 may check that 310 as the start data is included in 310, 311, 312 and 313 as the third transaction data TRAN_WDATA3 which are stored in the write buffer C31.

The controller C30 classifies D, E and F as write data WDATA of which transaction ID information are not set, among the write data WDATA stored in the write buffer C31, into the second write data NMAL_WDATA.

In this way, by checking transaction ID information corresponding to the respective write data WDATA stored in the write buffer C31, the controller C30 classifies the write data WDATA into the first transaction data TRAN_WDATA1, the third transaction data TRAN_WDATA3 and the second write data NMAL_WDATA.

The controller C30 has checked that the start data is not included in the first transaction data TRAN_WDATA1 stored in the write buffer C31. Therefore, when performing a flush operation for the write buffer C31, the controller C30 receives remaining data (including the start data 0) of the first transaction data TRAN_WDATA1, transferred from the first auxiliary device, stores the received data in the second auxiliary device, and then stores all of the first transaction data TRAN_WDATA1 which are stored in the write buffer C31, in the second auxiliary device.

In detail, the controller C30 requests the remaining data (including the start data 0) of the first transaction data TRAN_WDATA1, to the second nonvolatile memory device C50 selected as the first auxiliary device. Accordingly, the second nonvolatile memory device C50 reads therein 0, 1 and 2 as the remaining data of the first transaction data TRAN_WDATA1, and transfers them to the controller C30. After reading therein 0, 1 and 2 as the remaining data of the first transaction data TRAN_WDATA1 and transferring them to the controller C30, the second nonvolatile memory device C50 invalidates them.

In succession, the controller C30 transfers 0, 1 and 2 as the remaining data of the first transaction data TRAN_WDATA1 transferred from the second nonvolatile memory device C50, to the first nonvolatile memory device C40 selected as the second auxiliary device. Accordingly, the first nonvolatile memory device C40 stores therein 0, 1 and 2 as the remaining data of the first transaction data TRAN_WDATA1 transferred from the controller C30.

Then, the controller C30 transfers 3, 4 and 5 as all of the first transaction data TRAN_WDATA1 stored in the write buffer C31, to the first nonvolatile memory device C40. Accordingly, the first nonvolatile memory device C40 stores therein 3, 4 and 5 as the first transaction data TRAN_WDATA1 transferred from the controller C30.

Thus, 0, 2, 3, 4 and 5 as all the first transaction data TRAN_WDATA1 may be stored in the first nonvolatile memory device C40.

The controller C30 has checked that the start data is included in the third transaction data TRAN_WDATA3 which are transaction-completed. Therefore, when performing the flush operation for the write buffer C31, the controller C30 stores all of the third transaction data TRAN_WDATA3 which are stored in the write buffer C31 and are transaction-completed, in the second auxiliary device. Namely, the controller C30 transfers 310, 311, 312 and 313 as all of the third transaction data TRAN_WDATA3 stored in the write buffer C31, to the first nonvolatile memory device C40 which is selected as the second auxiliary device. Accordingly, the first nonvolatile memory device C40 stores therein 310, 311, 312 and 313 as the third transaction data TRAN_WDATA3 transferred from the controller C30.

When performing the flush operation for the write buffer C31, the controller C30 stores all the second write data NMAL_WDATA which are stored in the write buffer C31 and are not grouped into a transaction, in the main device. Namely, the controller C30 transfers all of the second write data NMAL_WDATA which are stored in the write buffer C31, to the third nonvolatile memory device C60 which is selected as the main device. Accordingly, the third nonvolatile memory device C60 stores therein D, E and F as the second write data NMAL_WDATA transferred from the controller C30.

Figure 7C:
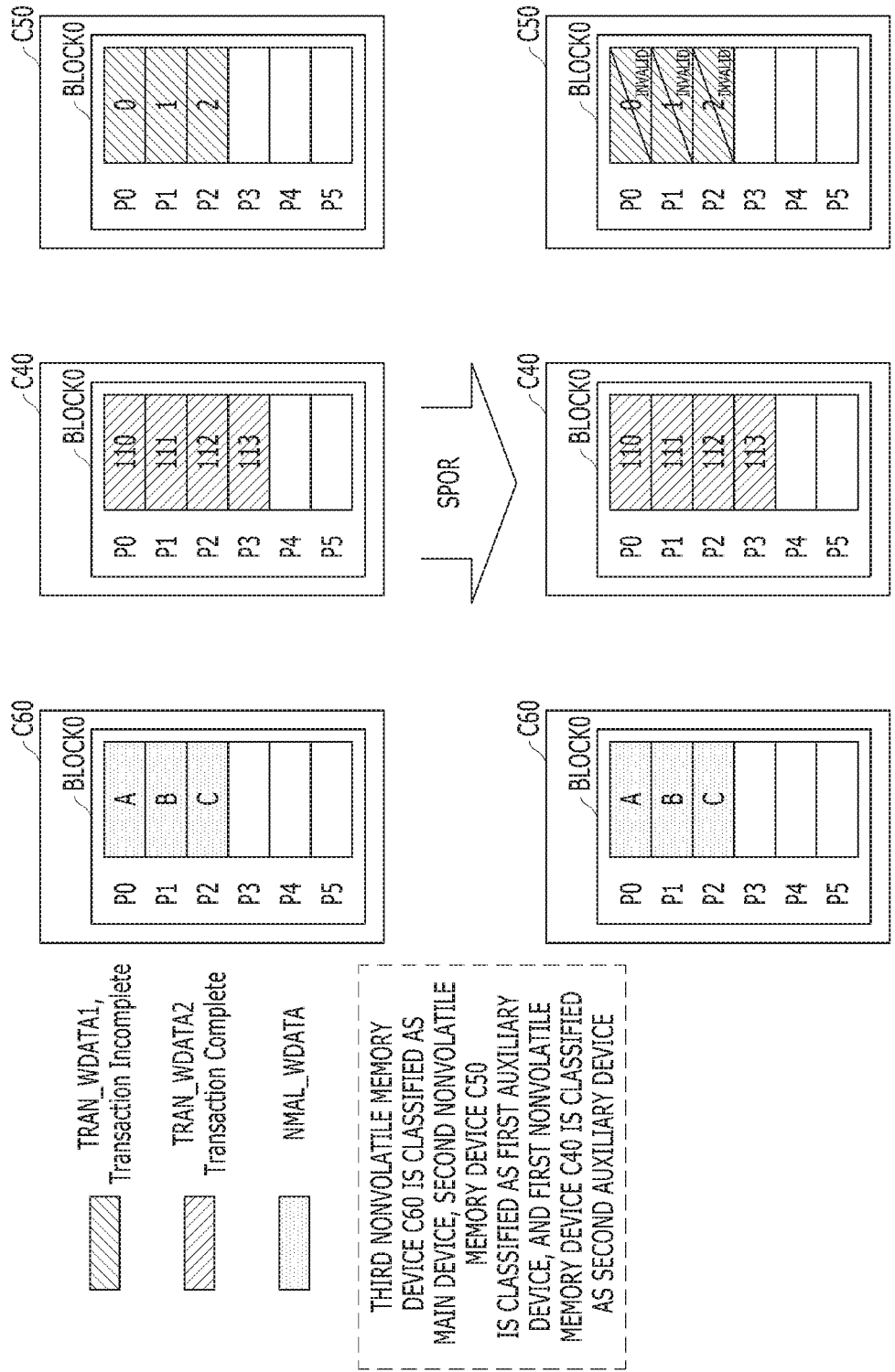

Referring to FIG. 7C, as a result of the flush operation for the write buffer C31 described above with reference to FIG. 7A, it is a state in which 0, 1 and 2 as the first transaction data TRAN_WDATA1 are stored in the second nonvolatile memory device C50 selected as the first auxiliary device. Also, as a result of the flush operation for the write buffer C31 described above with reference to FIG. 7A, it is a state in which the second transaction data TRAN_WDATA2 are stored in the first nonvolatile memory device C40 selected as the second auxiliary device. Moreover, as a result of the flush operation for the write buffer C31 described above with reference to FIG. 7A, it is a state in which the second write data NMAL_WDATA which are not grouped into a transaction are stored in the third nonvolatile memory device C60 selected as the main device.

In this state, if power is supplied again after a sudden power-off (SPO) occurs in the data processing system, the controller C30 enters a sudden power-off recovery (SPOR) period for a recovery operation.

In the SPOR period, the controller C30 invalidates all data stored in the first auxiliary device. In succession, the controller C30 transfers an information on the transaction corresponding to the invalided data stored in the first auxiliary device, to the host C10.

In detail, in the SPOR period, the controller C30 requests data invalidation to the second nonvolatile memory device C50 selected as the first auxiliary device. Due to this fact, the second nonvolatile memory device C50 invalidates all of the data stored therein, that is, 0, 1 and 2 as the remaining data of the first transaction data TRAN_WDATA1. In this way, after the remaining data of the first transaction data TRAN_WDATA1 stored in the second nonvolatile memory device C50 are invalidated, the controller C30 transfers an information that the first transaction is not ensured, to the host C10.

Referring to FIG. 7D, it may be seen that 0, 1, 2, 3, 4 and 5 as first transaction data TRAN_WDATA1 and 110, 111, 112 and 113 as second transaction data TRAN_WDATA2 are stored in the write buffer C31.

First, the controller C30 classifies 0, 1, 2, 3, 4 and 5 as write data WDATA of which transaction ID information have the first value, among the write data WDATA stored in the write buffer C31, into the first transaction data TRAN_WDATA1. By checking that a preset commit information is included in 0, 1, 2, 3, 4 and 5 as the first transaction data TRAN_WDATA1 stored in the write buffer C31, the controller C30 may be aware that it is a transaction-completed state in which the commit of the first transaction is completed.

The controller C30 checks whether start data is included in the entire first transaction data TRAN_WDATA1 stored in the write buffer C31, when checking that it is a state in which the commit of the first transaction data TRAN_WDATA1 is completed. It may be assumed that the start data of the first transaction data TRAN_WDATA1 is 0. That is, the controller C30 may check that 0 as the start data is included in 0, 1, 2, 3, 4 and 5 as the first transaction data TRAN_WDATA1 which are stored in the write buffer C31.

The controller C30 classifies 110, 111, 112 and 113 as write data WDATA of which transaction ID information have the second value, among the write data WDATA stored in the write buffer C31, into the second transaction data TRAN_WDATA2. By checking that a preset commit information is included in 110, 111, 112 and 113 as the second transaction data TRAN_WDATA2, the controller C30 may be aware that it is a transaction-completed state in which the commit of the second transaction is completed.

The controller C30 checks whether start data is included in the entire second transaction data TRAN_WDATA2 stored in the write buffer C31, when checking that it is a state in which the commit of the second transaction data TRAN_WDATA2 is completed. It may be assumed that the start data of the second transaction data TRAN_WDATA2 is 110. That is, the controller C30 may check that 110 as the start data is included in 110, 111, 112 and 113 as the second transaction data TRAN_WDATA2 which are stored in the write buffer C31.

In this way, by checking transaction ID information corresponding to the respective write data WDATA stored in the write buffer C31, the controller C30 classifies the write data WDATA into the first transaction data TRAN_WDATA1 and the second transaction data TRAN_WDATA2.

The controller C30 has checked that the start data is included in the first transaction data TRAN_WDATA1 which are transaction-completed. Therefore, when performing a flush operation for the write buffer C31, the controller C30 stores all of the first transaction data TRAN_WDATA1 which are stored in the write buffer C31 and are transaction-completed, in the second auxiliary device. Namely, the controller C30 transfers 0, 1, 2, 3, 4 and 5 as all of the first transaction data TRAN_WDATA1 stored in the write buffer C31, to the first nonvolatile memory device C40 which is selected as the second auxiliary device. Accordingly, the first nonvolatile memory device C40 stores therein 0, 1, 2, 3, 4 and 5 as the first transaction data TRAN_WDATA1 transferred from the controller C30.

The controller C30 has checked that the start data is included in the second transaction data TRAN_WDATA2 which are transaction-completed. Therefore, when performing the flush operation for the write buffer C31, the controller C30 transfers all of the second transaction data TRAN_WDATA2 which are stored in the write buffer C31 and are transaction-completed, to the second auxiliary device, and thereby, stores them in the second auxiliary device. Namely, the controller C30 transfers 110, 111, 112 and 113 as all of the second transaction data TRAN_WDATA2 stored in the write buffer C31, to the first nonvolatile memory device C40 which is selected as the second auxiliary device. Accordingly, the first nonvolatile memory device C40 stores therein 110, 111, 112 and 113 as the second transaction data TRAN_WDATA2 transferred from the controller C30.

The first nonvolatile memory device C40 includes the plurality of memory blocks MEMORY BLOCK<0, 1, 2, . . . >.

The first nonvolatile memory device C40 selected as the second auxiliary device simultaneously receives the first transaction data TRAN_WDATA1 and the second transaction data TRAN_WDATA2 transferred from the controller C30.

The first nonvolatile memory device C40 stores 0, 1, 2, 3, 4 and 5 as the first transaction data TRAN_WDATA1, in a zeroth memory block BLOCK0 included therein.

The first nonvolatile memory device C40 stores 110, 111, 112 and 113 as the second transaction data TRAN_WDATA2, in a first memory block BLOCK1 included therein.

Figure 7E:
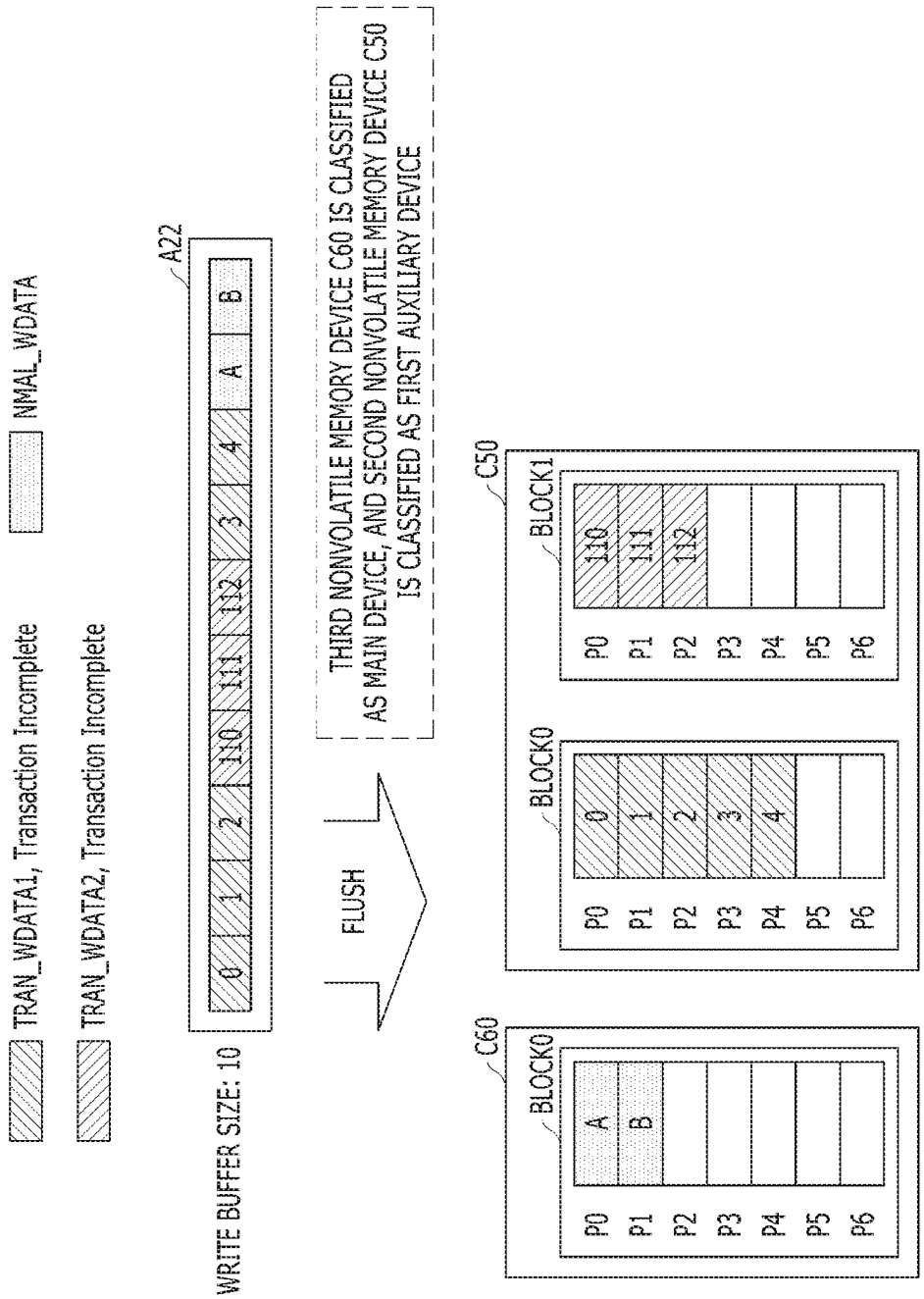

Referring to FIG. 7E, it may be seen that 0, 1, 2, 3 and 4 as first transaction data TRAN_WDATA1, 110, 111 and 112 as second transaction data TRAN_WDATA2 and A and B as second write data NMAL_WDATA are stored in the write buffer C31.

First, the controller C30 classifies 0, 1, 2, 3 and 4 as write data WDATA of which transaction ID information have the first value, among the write data WDATA stored in the write buffer C31, into the first transaction data TRAN_WDATA1. By checking that a preset commit information and a preset abort information are not included in 0, 1, 2, 3 and 4 as the first transaction data TRAN_WDATA1 stored in the write buffer C31, the controller C30 may be aware that it is a transaction-uncompleted state in which the commit of the first transaction is not completed.

The controller C30 classifies 110, 111 and 112 as write data WDATA of which transaction ID information have the second value, among the write data WDATA stored in the write buffer C31, into the second transaction data TRAN_WDATA2. By checking that a preset commit information and a preset abort information are not included in 110, 111 and 112 as the second transaction data TRAN_WDATA2 stored in the write buffer C31, the controller C30 may be aware that it is a transaction-uncompleted state in which the commit of the second transaction is not completed.

The controller C30 classifies A and B as write data WDATA of which transaction ID information are not set, among the write data WDATA stored in the write buffer C31, into the second write data NMAL_WDATA.

In this way, by checking transaction ID information corresponding to the respective write data WDATA stored in the write buffer C31, the controller C30 classifies the write data WDATA into the first transaction data TRAN_WDATA1, the second transaction data TRAN_WDATA2 and the second write data NMAL_WDATA.

Then, when performing a flush operation for the write buffer C31, the controller C30 stores the first transaction data TRAN_WDATA1 which are transaction-uncompleted, in the first auxiliary device. In other words, the controller C30 transfers 0, 1, 2, 3 and 4 as the first transaction data TRAN_WDATA1 to the second nonvolatile memory device C50 which is selected as the first auxiliary device. Accordingly, the second nonvolatile memory device C50 stores therein 0, 1, 2, 3 and 4 as the first transaction data TRAN_WDATA1 transferred from the controller C30.

When performing the flush operation for the write buffer C31, the controller C30 stores the second transaction data TRAN_WDATA2 which are transaction-uncompleted, in the first auxiliary device. In other words, the controller C30 transfers 110, 111 and 112 as the second transaction data TRAN_WDATA2 to the second nonvolatile memory device C50 which is selected as the first auxiliary device. Accordingly, the second nonvolatile memory device C50 stores therein 110, 111 and 112 as the second transaction data TRAN_WDATA2 transferred from the controller C30.

When performing the flush operation for the write buffer C31, the controller C30 stores all the second write data NMAL_WDATA which are stored in the write buffer C31 and are not grouped into a transaction, in the main device. Namely, the controller C30 transfers all of the second write data NMAL_WDATA which are stored in the write buffer C31, to the third nonvolatile memory device C60 which is selected as the main device. Accordingly, the third nonvolatile memory device C60 stores therein A and B as the second write data NMAL_WDATA transferred from the controller C30.

The second nonvolatile memory device C50 includes the plurality of memory blocks MEMORY BLOCK<0, 1, 2, . . . >.

The second nonvolatile memory device C50 selected as the first auxiliary device simultaneously receives the first transaction data TRAN_WDATA1 and the second transaction data TRAN_WDATA2 transferred from the controller C30.

The second nonvolatile memory device C50 stores 0, 1, 2, 3 and 4 as the first transaction data TRAN_WDATA1, in a zeroth memory block BLOCK0 included therein.

The second nonvolatile memory device C50 stores 110, 111 and 112 as the second transaction data TRAN_WDATA2, in a first memory block BLOCK1 included therein.

Figure 8:
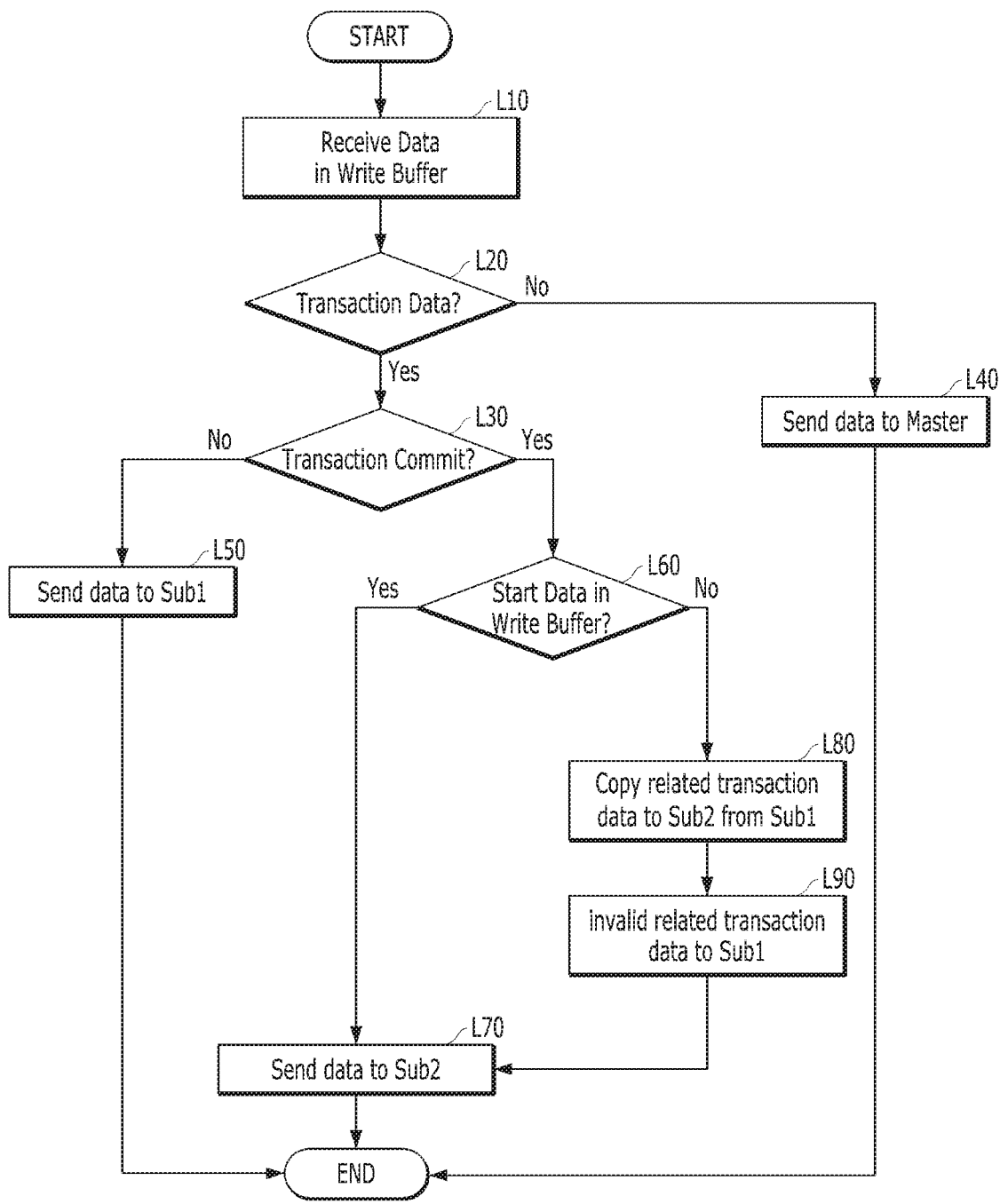
FIG. 8 is a flow chart of the operation of the data processing system including a plurality of memory systems in accordance with the second embodiment of the present disclosure.

FIG. 8 is a flow chart of the operation of the data processing system including a plurality of memory systems in accordance with the second embodiment of the present disclosure.

Referring to FIG. 8, the controller C30 receives write data WDATA in the write buffer C31 from the host C10 (L10).

The controller C30 checks whether the write data WDATA received in the write buffer C31 at the step L10 are data grouped into a transaction (L20).

In the case where, as a result of the step L20, the write data WDATA are not grouped into a transaction (NO), the write data WDATA are stored in the main device (L40).

In the case where, as a result of the step L20, the write data WDATA are grouped into a transaction (YES), whether the transaction is committed is checked (L30).

In the case where, as a result of the step L30, the transaction of the write data WDATA is not committed (NO), the write data WDATA are stored in the first auxiliary device (L50).

In the case where, as a result of the step L30, the transaction of the write data WDATA is committed (YES), whether start data of the committed transaction is included in the write buffer C31 is checked (L60).

In the case where, as a result of the step L60, the start data of the committed transaction is included in the write buffer C31 (YES), the write data WDATA which are stored in the write buffer C31 and of which transaction is committed are stored in the second auxiliary device (L70).

In the case where, as a result of the step L60, the start data of the committed transaction is not included in the write buffer C31 (NO), remaining data (including the start data) of the write data WDATA of which transaction is committed are received from the first auxiliary device and are stored in the second auxiliary device (L80).

In succession to the step L80, the remaining data of the write data WDATA of which transaction is committed are invalidated in the first auxiliary device (L90).

In succession to the step L90, the write data WDATA which are stored in the write buffer C31 and of which transaction is committed are stored in the second auxiliary device (L70).

As is apparent from the above descriptions, in the technology in accordance with the second embodiment of the present disclosure, data received from a host may be stored by being appropriately distributed over a plurality of nonvolatile memory devices, depending on whether the received data are grouped into a transaction or not, and whether transaction data are committed or not.

Through this, an algorithm for ensuring the transaction data may be simplified. Moreover, it is possible to easily distinguish the valid/invalid state of the transaction data in an SPOR (sudden power-off recovery) operation.

Although various embodiments have been described for illustrative purposes, it will be apparent to those skilled in the art that various changes and modifications may be made without departing from the spirit and scope of the invention as defined in the following claims.

What is claimed is:
1. A data processing system comprising:
a first memory system including a first nonvolatile memory device;
a second memory system including a second nonvolatile memory device; and
a master system including a third nonvolatile memory device, and configured to classify any one of the first memory system and the second memory system as a first slave system and the other as a second slave system depending on a predetermined reference,
wherein the master system is coupled to a host, and comprises a write buffer for temporarily storing a plurality of write data inputted from the host,
wherein the master system is further configured to:
classify the write data stored in the write buffer, into first write data grouped into a transaction and second write data which are not grouped into the transaction,
store the second write data in the third nonvolatile memory device, determine the first write data as incompletely or completely committed based on commit information indicating whether the first write data is incompletely or completely committed, classify the first write data, which are determined as incompletely committed among the first write data stored in the write buffer, into third write data, classify the first write data, which are determined as completely committed among the first write data stored in the write buffer, into fourth write data, transfer the third write data to the first slave system to store the third write data in a nonvolatile memory device included in the first slave system, and transfer the fourth write data to the second slave system to store the fourth write data in a nonvolatile memory device included in the second slave system.

2. The data processing system according to claim 1, wherein the master system performs, in the case where both the first nonvolatile memory device and the second nonvolatile memory device are capable or incapable of being overwritten, a first comparison operation of comparing a total size of the first nonvolatile memory device and a total size of the second nonvolatile memory device, classifies, in the case where, as a result of the first comparison operation, the total size of the first nonvolatile memory device is smaller, the first memory system as the first slave system and the second memory system as the second slave system, and classifies, in the case where, as a result of the first comparison operation, the total size of the first nonvolatile memory device is larger, the second memory system as the first slave system and the first memory system as the second slave system.

3. The data processing system according to claim 2, wherein the master system performs, in the case where, as a result of the first comparison operation, the total size of the first nonvolatile memory device and the total size of the second nonvolatile memory device are the same, a second comparison operation of comparing a size of an empty space in the first nonvolatile memory device and a size of an empty space in the second nonvolatile memory device, classifies, in the case where, as a result of the second comparison operation, the size of the empty space in the first nonvolatile memory device is smaller, the first memory system as the first slave system and the second memory system as the second slave system, and classifies, in the case where, as a result of the second comparison operation, the size of the empty space in the first nonvolatile memory device is larger, the second memory system as the first slave system and the first memory system as the second slave system.

4. The data processing system according to claim 1, wherein the master system classifies, in the case where any one of the first nonvolatile memory device and the second nonvolatile memory device is capable of being overwritten and the other is incapable of being overwritten, the nonvolatile memory device which is capable of being overwritten, as the first slave system, and the other nonvolatile memory device which is incapable of being overwritten, as the second slave system.

5. The data processing system according to claim 1, wherein the master system stores, at a time of classifying the first write data into the fourth write data, in the case where start data of a first transaction is included in fourth write data of the first transaction stored in the write buffer, the fourth write data of the first transaction stored in the write buffer, in the nonvolatile memory device included in the second slave system, by transferring them to the second slave system.

6. The data processing system according to claim 5, wherein, when classifying the first write data into the fourth write data, in the case where start data of the data group for a second transaction is not included in fourth write data of the second transaction stored in the write buffer, the master system reads remaining data of the second transaction which are not stored in the write buffer, from the nonvolatile memory device included in the first slave system, through the first slave system, stores the remaining data in the nonvolatile memory device included in the second slave system by transferring the remaining data to the second slave system, and invalidates the remaining data of the second transaction in the nonvolatile memory device included in the first slave system, through the first slave system, and stores the fourth write data of the second transaction stored in the write buffer, in the nonvolatile memory device included in the second slave system, by transferring the fourth write data of the second transaction to the second slave system.

7. The data processing system according to claim 1, wherein the master system-, in a recovery operation period that is entered after a sudden power-off (SPO) occurs, invalidates all data stored in the nonvolatile memory device included in the first slave system, through the first slave system, and transfers an information on a transaction corresponding to the invalided data, to the host.

8. The data processing system according to claim 1, wherein each of the first nonvolatile memory device and the second nonvolatile memory device comprises a plurality of memory blocks, wherein the first slave system, in the case where third write data of a third transaction and third write data of a fourth transaction are received therein from the master system, stores the third write data of the third transaction by selecting a first memory block of the nonvolatile memory device included therein, and stores the third write data of the fourth transaction by selecting a second memory block of the nonvolatile memory device included therein, and wherein the second slave system, in the case where fourth write data of a fifth transaction and fourth write data of a sixth transaction are received therein from the master system, stores the fourth write data of the fifth transaction by selecting a third memory block of the nonvolatile memory device included therein, and stores the fourth write data of the sixth transaction by selecting a fourth memory block of the nonvolatile memory device included therein.

9. A memory system comprising:

a first nonvolatile memory device;

a second nonvolatile memory device;

a third nonvolatile memory device; and a controller configured to classify each of the first to third nonvolatile memory devices as one of a main device first and second auxiliary devices depending on a predetermined reference, wherein the controller comprises a write buffer for temporarily storing a plurality of write data inputted from a host, and wherein the controller is further configured to:
classify the write data stored in the write buffer, into first write data grouped into a transaction and second write data which are not grouped into a transaction,
store the second write data in the main device,
determine the first write data as incompletely or completely committed based on commit information indicating whether the first write data is incompletely or completely committed,
classify the first write data, which are determined as incompletely committed among the first write data stored in the write buffer, into third write data,
classify the first write data, which are determined as completely committed among the first write data stored in the write buffer, into fourth write data,
store the third write data in the first auxiliary device, and store the fourth write data in the second auxiliary device.

10. The memory system according to claim 9,
wherein the controller performs, in the case where all of the first nonvolatile memory device, the second nonvolatile memory device and the third nonvolatile memory device are capable of being overwritten or are incapable of being overwritten, a first comparison operation of comparing a total size of the first nonvolatile memory device, a total size of the second nonvolatile memory device and a total size of the third nonvolatile memory device, and
wherein the controller classifies, as a result of the first comparison operation, a memory device having a largest size as the main device, a memory device having a smallest size as the first auxiliary device, and a memory device having a middle size as the second auxiliary device.

11. The memory system according to claim 10,
wherein the controller performs, in the case where, as a result of the first comparison operation, all of the first nonvolatile memory device, the second nonvolatile memory device and the third nonvolatile memory device having the same total size, a second comparison operation of comparing a size of an empty space in the first nonvolatile memory device, a size of an empty space in the second nonvolatile memory device and a size of an empty space in the third nonvolatile memory device, and
wherein the controller classifies, as a result of the second comparison operation, a memory device having a largest empty space size as the main device, a memory device having a smallest empty space size as the first auxiliary device, and a memory device having a middle empty space size as the second auxiliary device.

12. The memory system according to claim 9,
wherein the controller classifies, in the case where any one of the first nonvolatile memory device, the second nonvolatile memory device and the third nonvolatile memory device is capable of being overwritten and remaining two are incapable of being overwritten, the any one memory device which is capable of being overwritten, as the first auxiliary device, any one of which total size is larger, between the remaining two memory devices which are incapable of being overwritten, as the main device, and the other as the second auxiliary device, and the controller classifies, in the case where total sizes of the remaining two memory devices which are incapable of being overwritten are the same, any one of which empty space is larger, as the main device, and the other as the second auxiliary device, and wherein the controller classifies, in the case where any one of the first nonvolatile memory device, the second nonvolatile memory device and the third nonvolatile memory device is incapable of being overwritten and remaining two are capable of being overwritten, the any one memory device which is incapable of being overwritten, as the main device, any one of which total size is smaller, between the remaining two memory devices which are capable of being overwritten, as the first auxiliary device, and the other as the second auxiliary device, and the controller classifies, in the case where total sizes of the remaining two memory devices which are capable of being overwritten are the same, any one of which empty space is smaller, as the first auxiliary device, and the other as the second auxiliary device.

13. The memory system according to claim 9, wherein, at a time of classifying the first write data into the fourth write data, in the case where start data of the data group for a first transaction is included in fourth write data of the first transaction stored in the write buffer, the controller stores the fourth write data of the first transaction stored in the write buffer, in the second auxiliary device.

14. The memory system according to claim 13, wherein, when classifying the first write data into the fourth write data, in the case where start data of a second transaction is not included in fourth write data of the second transaction stored in the write buffer, the controller
reads remaining data of the second transaction which are not stored in the write buffer, from the first auxiliary device, stores the remaining data in the second auxiliary device, and invalidates the remaining data of the second transaction in the first auxiliary device, and
stores the fourth write data of the second transaction stored in the write buffer, in the second auxiliary device.

15. The memory system according to claim 9, wherein, in a recovery operation period that is entered after a sudden power-off (SPO) occurs, the controller invalidates all data stored in the first auxiliary device, and transfers an information on a transaction corresponding to the invalided data, to the host.

16. The memory system according to claim 9,
wherein each of the first auxiliary device and the second auxiliary device comprises a plurality of memory blocks, and
wherein the controller, in the case where, when performing a flush operation, third write data of a third transaction, third write data of a fourth transaction, fourth write data of a fifth transaction and fourth write data of a sixth transaction are stored in the write buffer, stores the third write data of the third transaction by selecting a first memory block of the first auxiliary device, stores the third write data of the fourth transaction by selecting a second memory block of the first auxiliary device, stores the fourth write data of the fifth transaction by selecting a third memory block of the second auxiliary device, and stores the fourth write data of the sixth transaction by selecting a fourth memory block of the second auxiliary device.

17. A memory system comprising:
first and second memory devices;
a buffer configured to buffer a first partial group for a transaction provided from an external; and
controller configured to:
control, when the buffered first partial data group forms together with a second partial data group stored in the first memory device a second whole data group, the second memory device to store therein the second whole data group by flushing the buffered first partial data group and by controlling the first and second memory device to move the second partial data group from the first memory device into the second memory device; and control, when the buffered first partial data group does not yet form together with the second partial data group the second whole data group, the first memory device to store therein the buffered first partial data group by flushing the buffered first partial data group.

\* \* \* \* \*